(12) United States Patent
Kyaw et al.

(10) Patent No.: US 11,783,986 B2
(45) Date of Patent: Oct. 10, 2023

(54) RESONANT COILS WITH INTEGRATED CAPACITANCE

(71) Applicant: THE TRUSTEES OF DARTMOUTH COLLEGE, Hanover, NH (US)

(72) Inventors: Phyo Aung Kyaw, West Lebanon, NH (US); Aaron Stein, West Lebanon, NH (US); Charles R. Sullivan, West Lebanon, NH (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 389 days.

(21) Appl. No.: 16/994,448

(22) Filed: Aug. 14, 2020

(65) Prior Publication Data

US 2021/0050136 A1 Feb. 18, 2021

Related U.S. Application Data

(60) Provisional application No. 62/888,354, filed on Aug. 16, 2019.

(51) Int. Cl.
*H01F 27/28* (2006.01)
*H01F 17/06* (2006.01)
*H01F 38/14* (2006.01)
*H01F 17/00* (2006.01)

(52) U.S. Cl.
CPC ....... *H01F 17/062* (2013.01); *H01F 17/0013* (2013.01); *H01F 38/14* (2013.01)

(58) Field of Classification Search
CPC .... H01F 17/062; H01F 17/0013; H01F 38/14; H01G 4/30; H01G 4/012; H01G 4/40

USPC .......................................... 336/200, 232, 198
See application file for complete search history.

(56) References Cited

U.S. PATENT DOCUMENTS

| 3,302,082 | A | 5/1965 | Preissinger |
| 3,560,904 | A | 2/1971 | Wilkes |
| 5,898,562 | A | 4/1999 | Cain et al. |
| 5,997,800 | A | 12/1999 | Wimberger Friedl et al. |
| 6,946,833 | B1 | 9/2005 | Logue et al. |
| 2004/0108311 | A1 | 6/2004 | de Rooij et al. |
| 2004/0179326 | A1 | 9/2004 | Hattori |
| 2004/0246692 | A1 | 12/2004 | Satoh |
| 2004/0257175 | A1 | 12/2004 | Hidaka et al. |

(Continued)

FOREIGN PATENT DOCUMENTS

| JP | 11097244 A | 4/1999 |
| JP | 2000351945 A | 12/2000 |
| WO | WO 2014121100 A1 | 8/2014 |

OTHER PUBLICATIONS

U.S. Appl. No. 16/319,633 Non-Final Office Action dated Oct. 21, 2022, 24 pages.

(Continued)

*Primary Examiner* — Shawki S Ismail
*Assistant Examiner* — Kazi S Hossain
(74) *Attorney, Agent, or Firm* — Cozen O'Connor

(57) ABSTRACT

A resonant coil with integrated capacitance includes at least one separation dielectric layer and a plurality of conductor layers stacked in an alternating manner. Each of the plurality of conductor layers includes a first conductor sublayer and second conductor sublayer having common orientation and a sublayer dielectric layer separating the first and second conductor sublayers, each conductor layer having multiple discontinuities.

23 Claims, 23 Drawing Sheets

(56) References Cited

U.S. PATENT DOCUMENTS

| | | | |
|---|---|---|---|
| 2005/0110606 A1* | 5/2005 | Vinciarelli | H01F 27/2804 336/200 |
| 2007/0063330 A1 | 3/2007 | Park et al. | |
| 2008/0061917 A1 | 3/2008 | Manoukian et al. | |
| 2009/0127962 A1 | 5/2009 | Ohyama et al. | |
| 2011/0101788 A1 | 5/2011 | Sun et al. | |
| 2012/0267142 A1 | 10/2012 | Nordin et al. | |
| 2013/0020877 A1 | 1/2013 | Miller | |
| 2013/0100576 A1 | 4/2013 | Seo et al. | |
| 2016/0005531 A1* | 1/2016 | Sullivan | H01P 3/16 336/200 |
| 2016/0086721 A1 | 3/2016 | Park | |
| 2018/0005752 A1* | 1/2018 | Takayama | H01F 27/28 |

OTHER PUBLICATIONS

U.S. Appl. No. 16/319,633 Non-Final Office Action dated Mar. 8, 2022, 21 pages.
U.S. Appl. No. 14/765,306, filed Jul. 31, 2015, 274 pages.
International Patent Application No. PCT/US2017/043377 Application as filed Jul. 21, 2017, 99 pages.
International Patent Application No. PCT/US2014/014203 International Search Report and Written Opinion dated May 20, 2014, 11 pages.
International Patent Application No. PCT/US2017/043377 International Search Report and Written Opinion dated Nov. 16, 2017, 15 pages.
International Patent Application No. PCT/US2017/043377 International Preliminary Report on Patentability dated Jan. 22, 2019, 12 pages.

\* cited by examiner

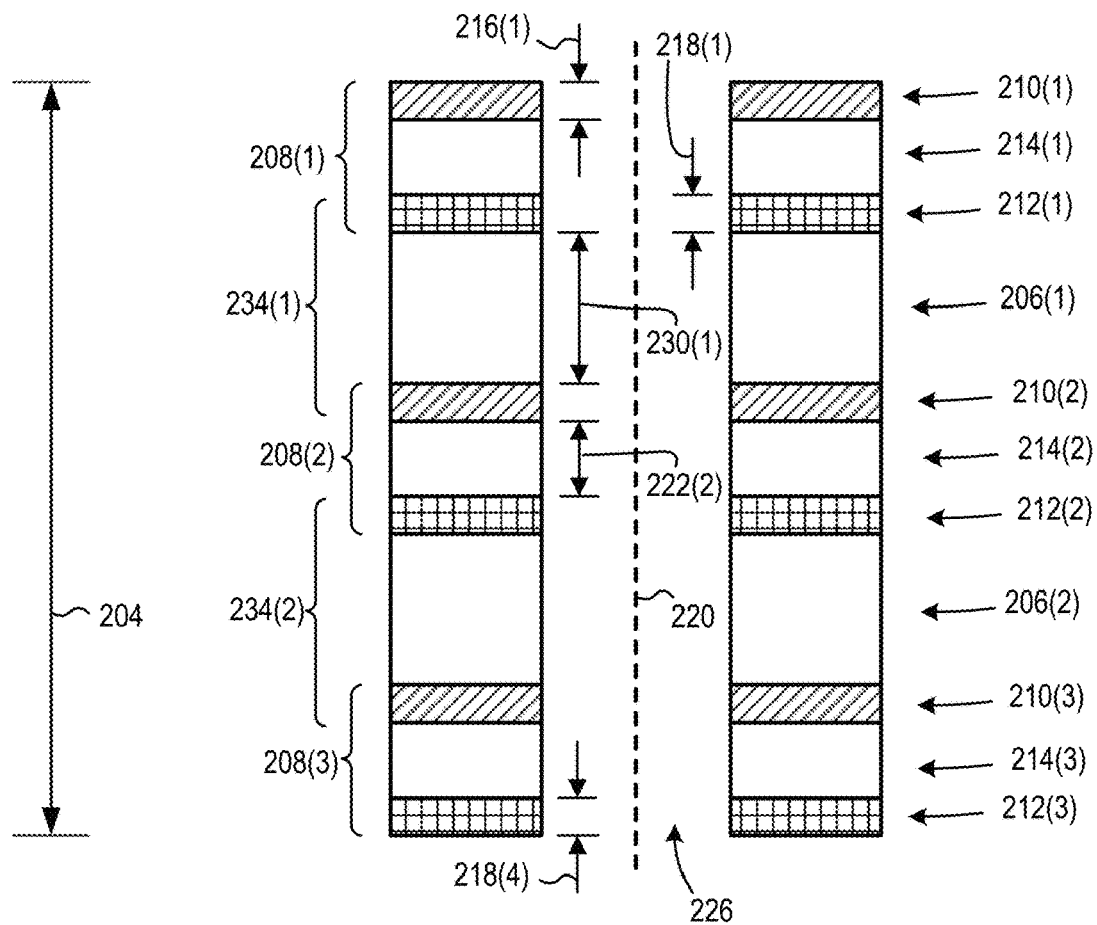
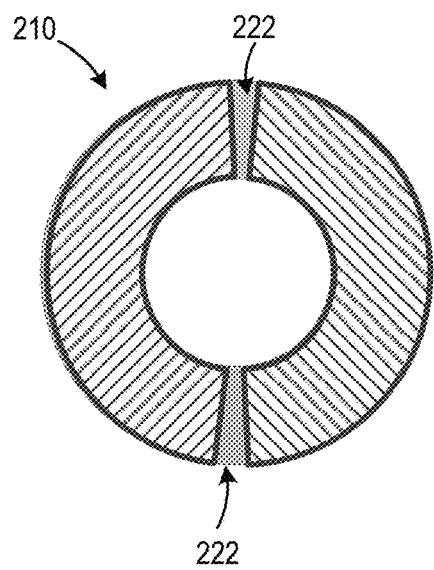 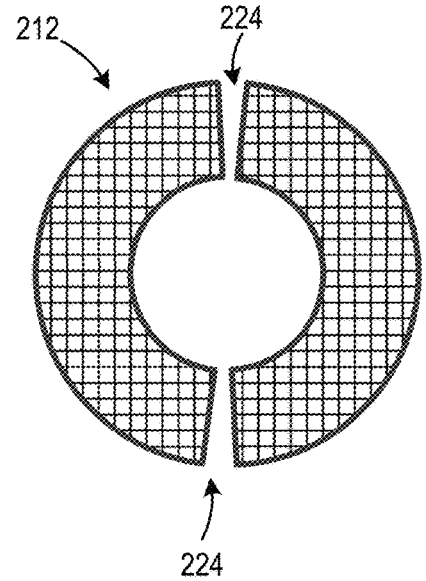
Figure 5  Figure 6

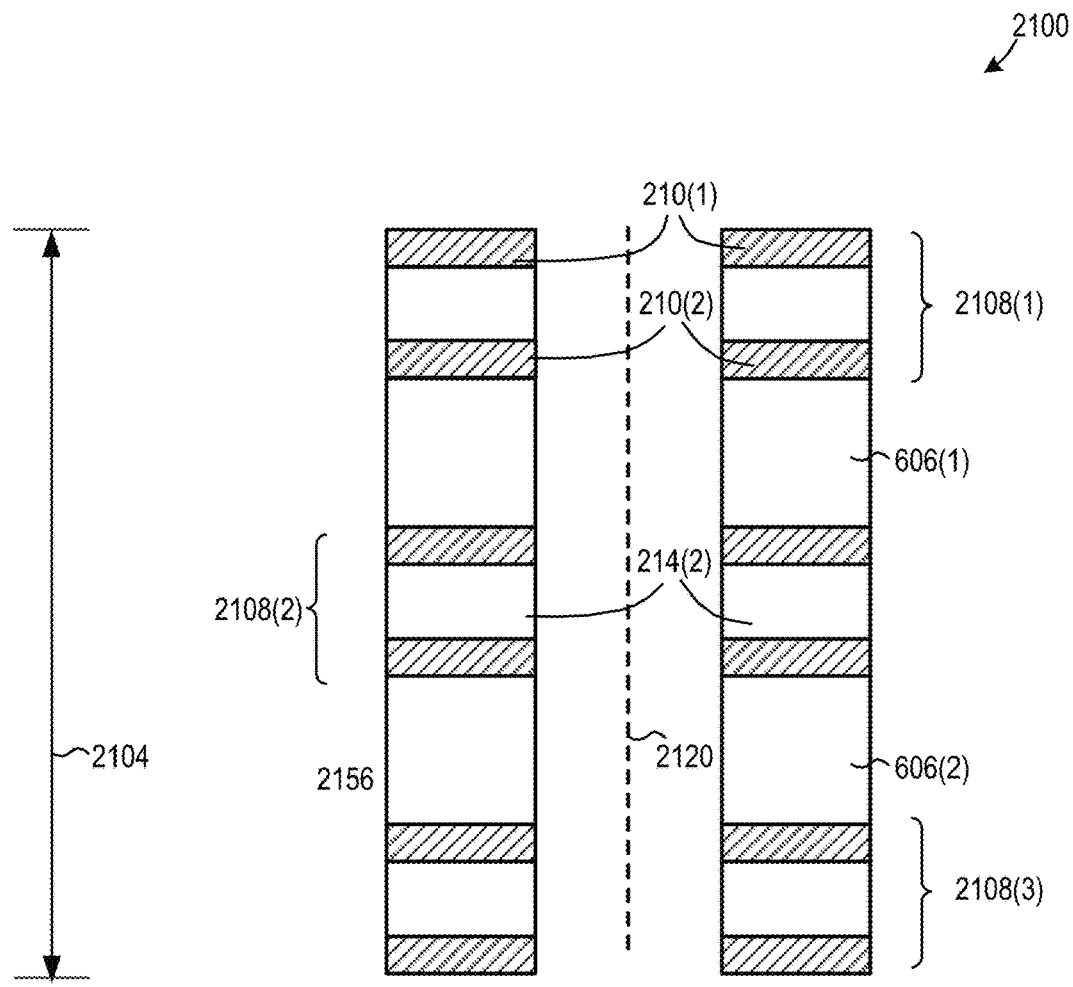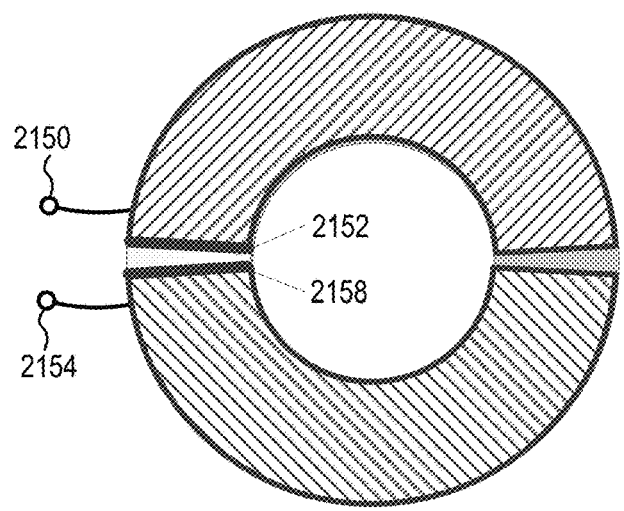
FIG. 21

RESONANT COILS WITH INTEGRATED CAPACITANCE

CROSS-REFERENCE TO RELATED APPLICATIONS

This application claims benefit of priority to U.S. Provisional Patent Application Ser. No. 62/888,354, filed Aug. 16, 2019, which is incorporated herein by reference in its entirety.

U.S. GOVERNMENT RIGHTS

This invention was made with government support under award number 1820089 awarded by the National Science Foundation. The government has certain rights in the invention.

BACKGROUND

Resonant coils with integrated capacitance are electrical conductors which exhibit capacitance and inductance. Consequently, these resonant coils can achieve resonance without external reactive components, when part of an electrical circuit. Resonant coils with integrated capacitance are used, for example, in high-frequency transmission lines, as resonant tank elements in electrical circuits, and to generate a magnetic field for uses such as induction heating, magnetic hyperthermia and wireless power transfer.

SUMMARY

Disclosed herein are new resonant coils, in which a number of sections can be increased while keeping a constant capacitance, voltage rating and the resonant coil thickness. Such a resonant coil is achieved, for example, by increasing the number of discontinuities in each conductor layers.

In an embodiment, a resonant coil with integrated capacitance includes at least one separation dielectric layer and a plurality of conductor layers stacked in an alternating manner. Each of the plurality of conductor layers includes a first conductor sublayer forming a plurality of first discontinuities and a second conductor sublayer forming a plurality of second discontinuities. Each second discontinuity is displaced from each first discontinuity, and a sublayer dielectric layer separates the first and second conductor sublayers, in each conductor layer.

In an embodiment, a resonant coil with integrated capacitance includes at least one separation dielectric layer and a plurality of conductor layers stacked in an alternating manner. Each of the plurality of conductor layers includes (1) a first conductor sublayer forming a plurality of first discontinuities and a second conductor sublayer forming a plurality of second discontinuities, each second discontinuity being aligned with each first discontinuity, and (2) a sublayer dielectric layer separating the first and second conductor sublayers. Adjacent conductor layers of the plurality of conductor layers have different orientations.

BRIEF DESCRIPTION OF THE DRAWINGS

FIG. 4 is a cross-sectional view of the FIG. 2 resonant coil taken along line 3A-3A of FIG. 2.

FIG. 5 is a top plan view of one first conductor sublayer instance of the FIG. 2 resonant coil.

FIG. 6 is a top plan view of one second conductor sublayer instance of the FIG. 2 resonant coil.

FIG. 21 is a cross-sectional view of an alternate embodiment of the FIG. 2 resonant coil configured to have a series-resonant topology.

DETAILED DESCRIPTION OF THE EMBODIMENTS

Disclosed herein are multilayer resonant coils, for which the number of conductor layers or sections—one section represents two conductor sublayers separated by a dielectric layer—is not limited by the required capacitance for achieving the desired resonant frequency.

Figure 1:
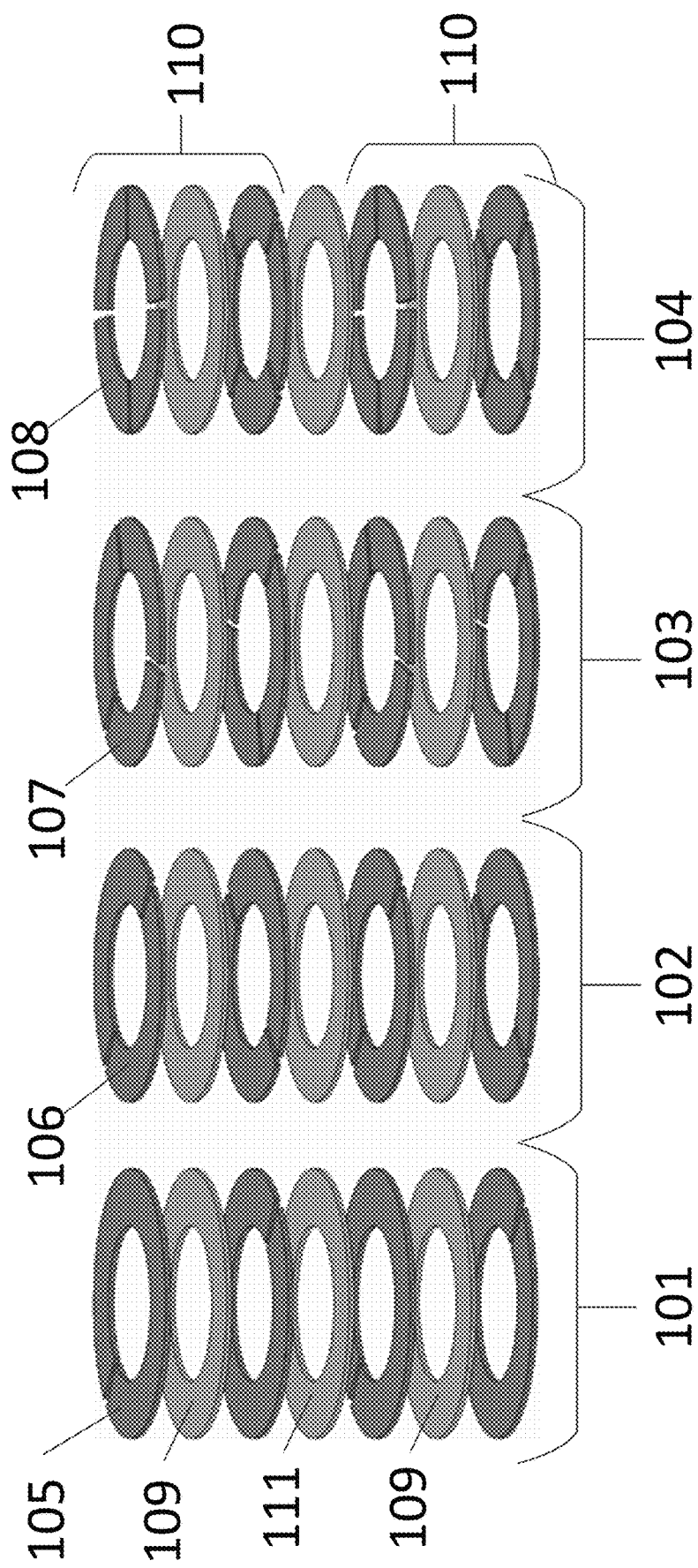
FIG. 1 illustrates a series of resonant coils.

Some conventional resonant coils, as shown in FIG. 1 as 101, include a set of C-shaped conductor layers stacked with opposing oriented gaps and separated by dielectric layers sandwiched around a dielectric layer 109. The conductor-dielectric conductor sections 110, sometimes referred to herein as conductor layers 110, are repeated with a separation dielectric layer 111 between them. Most high-performance implementations of such resonant coils require many sections, depending on the application and power to be processed. However, for a particular resonant coil radius, a required capacitance is typically fixed; therefore, thick dielectric layers are required if a large number of sections are to be used. Moreover, the dielectric layers need to be sufficiently thick to sustain the desired voltage rating. These factors result in an upper bound on the number of sections, since most applications have a constraint on the total thickness of the resonant coil.

Disclosed herein are new resonant coils in which the number of sections can be increased while keeping a constant capacitance, voltage rating, and the total resonant coil thickness. These resonant coils are achieved, for example, by increasing the number of discontinuities in each conductor layers. FIG. 1 shows three embodiments of these coils 102, 103, and 104 in addition to conventional resonant coil 101. Each resonant coil 101, 102, 103, and 104 also includes sublayer dielectric layers 109 separating adjacent conductive sublayers in each conductor layer 110. Conventional resonant coil 101 includes one gap or discontinuity in each conductor sublayer 105. In resonant coil 102, however, conductor layer 106 forms two discontinuities. In resonant coil 103, each conductor sublayer 107 forms three discontinuities, and in resonant coil 104, each conductor sublayer 108 forms four discontinuities. Applicant has determined that including a plurality of discontinuities in each conductor sublayer may achieve significant advantages.

For example, if we assume that each conductive layer 110 in resonant coil 101 has a capacitance of C, where C is fixed by its geometry, then the capacitance of conductor layer 110 in resonant coil 102 is one fourth C. With two discontinuities in sublayers 106, we can see that conductor layer 110 effectively forms two conductive elements of "plates" if we draw an analogy to a parallel plate capacitor. The two parallel plates made up by the conductor layers 110 in resonant coil 102 would each have half the area of the conductor layers 110 in resonant coil 101. That would make each of the two capacitors formed in resonant coil 102 have half the capacitance. The two capacitors combine in series reducing the capacitance of each conductor layer 110 by half again. The capacitance of each conductor layer 110 in a resonant coil including conductor layers forming two discontinuities is a quarter of the capacitance of a conductor layer forming one discontinuity. Since the capacitors act in series, the voltage is divided equally between them. This reduction in voltage stress allows the dielectric separating them to be thinner. Thus, thinner dielectric layers can be used for the two-discontinuity resonant coil to achieve the same resonant capacitance and voltage rating as a one-discontinuity resonant coil, resulting in a larger number of sections for a constrained total resonant coil thickness.

In general, for a resonant coil with n discontinuities (for fixed dielectric layer thickness), the capacitance of each section is reduced by the square of the number of discontinuities n. Additionally, the voltage rating of each section or conductor layer is n times greater. For resonant coil 103, the capacitance will be one ninth with a voltage stress of one third, and resonant coil 104 will have one sixteenth of the capacitance and one fourth of the voltage stress compared to resonant coils with one discontinuity.

Thus, by increasing the number of discontinuities within a conductor sublayer, thinner dielectric layers can be used while keeping the same resonant capacitance and voltage rating. This results in a larger number of conductor layers that can be fit in a constrained resonant coil thickness.

A prototype of the two-discontinuity resonant coil 102 with 8 sections, had a measured quality factor of 900, showing that multi-discontinuity resonant coils can achieve a high performance.

Figure 2:
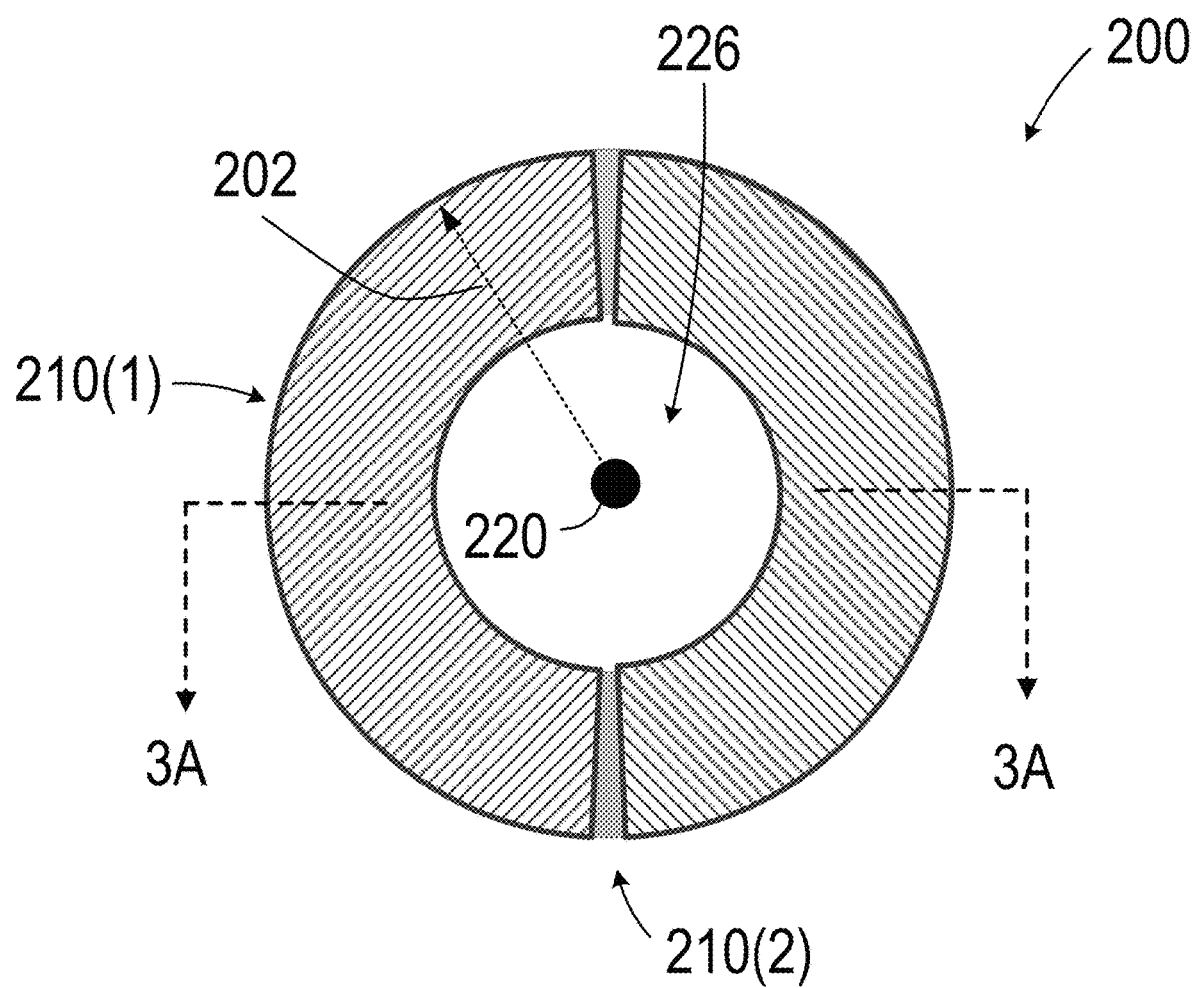
FIG. 2 is a top plan view of a resonant coil with integrated capacitance, according to an embodiment.
Figure 3:
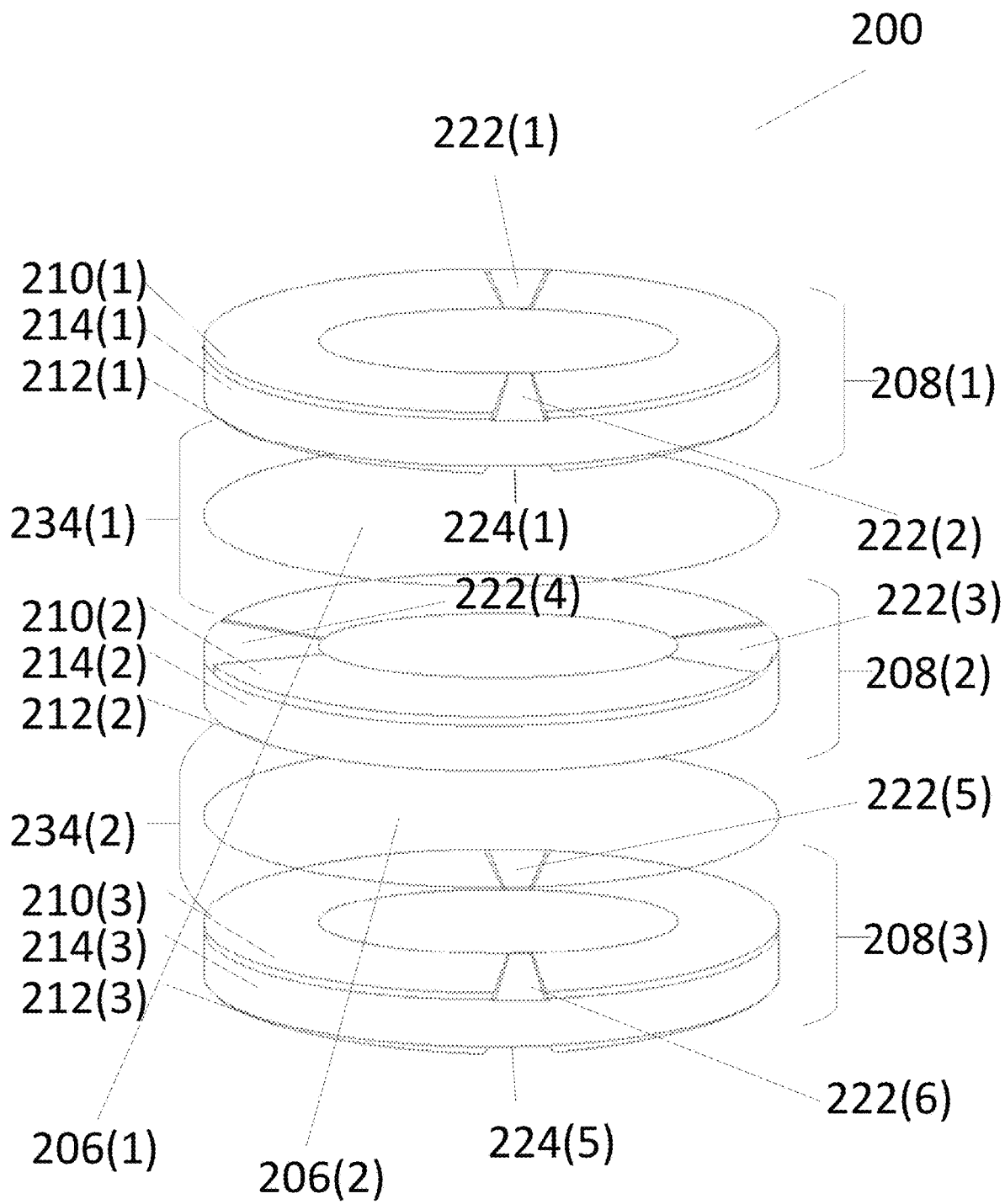
FIG. 3 is an exploded perspective view of the FIG. 2 resonant coil.

FIG. 2 is a top plan view of a resonant coil 200 with integrated capacitance, which is one embodiment of the new resonant coils developed by Applicant. FIG. 3 is an exploded view of the resonant coil 200. FIG. 4 is a cross-sectional view of the resonant coil taken along line 3A-3A of FIG. 2. Resonant coil 200 has a radius 202 and a thickness 204, and resonant coil 200 includes at least one separation dielectric layer 206 and a plurality of conductor layers 208 stacked in an alternating manner in the thickness 204 direction. Each conductor layer 208 includes a first conductor sublayer 210 and a second conductor sublayer 212 separated in the thickness 204 direction by a sublayer dielectric layer 214. FIG. 5 is a top plan view of one first conductor sublayer 210 instance, and FIG. 6 is a top plan view of one second conductor sublayer 212 instance. First and second conductor sublayers 210, 212 are formed, for example, of copper foil, aluminum foil, or another electrically conductive material, laminated to sublayer dielectric layer 214. It is anticipated that dielectric layers 206, 214 will typically extend slightly, such as one to five millimeters, beyond the edges of conductor sublayers 210, 212 to minimize the likelihood of arcing between the edges of adjacent conductor sublayers. Conductor sublayers 210, 212 have respective thicknesses 216, 218 (see FIG. 4) that are typically smaller than their skin depths at an intended operating frequency, thereby promoting efficient use of conductor sublayers 210, 212 and corresponding low power loss. Proximity losses increase with increasing values of thicknesses 216 and 218, while DC losses decrease with increasing values of thicknesses 216 and 218. In some embodiments, such as where the total number of conductor sublayers 210, 212 is fewer than 5, the thicknesses 216, 218 of conductor sublayers 210,212 may be approximately, or slightly larger, than their skin depths at intended operating frequencies. In other embodiments, the conductor sublayers 210, 212 instances near the bottom of the resonant coil 200 may have thicknesses 216, 218 which are approximately, or slightly larger, than their skin depths at an intended operating frequency. In some embodiments, thickness of the foil or conductive film is inversely proportional to the square root of the number of conductor layers 210. 212, such that thickness decreases as the number of conductor layers increases.

First and second conductor sublayers 210, 212 have at least substantially similar notched annular ring shapes. Conductor sublayers 210, 212 and dielectric layers 206, 214 are each disposed around a common center axis 220 extending in the thickness 204 direction. Each first conductor sublayer 210 forms two discontinuities or notches 222 such that the first conductor sublayer does not completely encircle center axis 220, and each second conductor sublayer 212 forms a second set of discontinuities or notches 224 such that the second conductor sublayer does not completely encircle center axis 220. Importantly, within a given conductor layer 208 instance, first conductor sublayer 210 is angularly aligned with second conductor sublayer 212 with respect to center axis 220, such that notches 222, 224 of first and second conductor sublayers 210, 212, respectively, are also angularly aligned. Consequently, first and second conductor sublayers 210, 212 of a given conductor layer 208 instance are commonly aligned when resonant coil 200 is viewed cross-sectionally in the thickness 204 direction.

The common alignment of first and second conductor sublayers 210, 212 within a given conductor layer 208 instance causes there to be negligible electric field between the first and second conductor sublayers, resulting in minimal excitation of the capacitance between the conductor sublayers. As a result, dielectric loss of sublayer dielectric layer 214 does not significantly affect performance of resonant coil 200. Consequently, sublayer dielectric layer 214 can be formed of low-cost, industry standard dielectric materials having relatively high-loss, such as FR4 or polyimide, without negatively impacting performance Additionally, sublayer dielectric layer 214 can be of essentially any desired thickness without materially affecting performance, since capacitance of sublayer dielectric layer 214 is minimally excited during operation, which facilitates use of standard PCB processing techniques and materials when forming resonant coil 200, thereby further promoting low cost and ease of manufacturing.

The plurality of conductor layers 208 in resonant coil 200 have alternating opposing orientations, where notches 222, 224 of one conductor layer 208 instance are angularly displaced from notches 222, 224 of an adjacent conductor layer 208 instance, with respect to center axis 220. In particular, first conductor layer 208(1) has a first orientation with notches 222, 224 at about zero degrees with respect to center axis 220, second conductor layer 208(2) has an opposite second orientation with notches 222, 224 at about 90 degrees with respect to center axis 220, third conductor layer 208(3) has the first orientation, and so on, as seen when resonant coil 200 is viewed cross-sectionally in the thickness 204 direction. Such alternating opposing orientation of adjacent conductor layers 208 results in an electric field between adjacent conductor layers 208, thereby achieving integrated capacitance of resonant coil 200, as discussed below with respect to FIG. 7. Adjacent conductor layers 208 may be angularly offset from each other at angles other than 90 degrees without departing from the scope hereof, as long as adjacent conductor layers 208 have different orientations. With two notches 90 degrees would keep them perfectly unaligned. With three notches a difference of 60 degrees is used, for example, to offset the notches between adjacent conductors, while 4 notches utilize a 45 degree offset in some embodiments. We can use any angle offset and are not limited to a particular offset, nor are the resonant coils limited to two notches for each conductor layer.

In contrast to sublayer dielectric layers 214, separation dielectric layers 206 must be formed of a low-loss dielectric material, such as PTFE, PFA, ETFE, FEP, polypropylene, polyethylene, polystyrene, glass, or ceramic, to achieve high performance, because there is significant electric field between conductor layers 208 during operation of resonant coil 200. However, low-loss dielectric films without metal foil laminated thereto are much less expensive than low-loss dielectric films laminated with foil. For example, PTFE film is readily available at low cost, but laminating it with copper is very expensive because it is difficult to adhere copper to the PTFE. Accordingly, separation dielectric layers 206 can be formed of low-loss dielectric material at a much lower cost than sublayer dielectric layers 214.

A dielectric material may be considered relatively low-loss, if the loss induced in that dielectric material is lower than the combination of losses induced in other materials of the resonant coil. For example, in embodiments where the quality factor of the winding is about 300, polyimide (with dielectric material factor of about 700 and loss tangent of about 0.0015) can be considered as a low-loss material.

Resonant coil 200 forms a center aperture 226, such that conductor sublayers 210, 212 are wound around the aperture and center axis 220. It is anticipated that in many embodiments, a magnetic core (not shown) will extend through aperture 226, to help direct the magnetic field produced by resonant coil 200 to where it is needed and to help prevent stray magnetic flux. Use of a magnetic core potentially also helps shape the magnetic field in the region of resonant coil 200 such that the magnetic flux above, below, and within resonant coil 200 travels approximately parallel to conductor layers 210, 212, thereby promoting even conductor current distribution and low eddy current losses in the conductors. A magnetic core can also be used to help achieve a desired reluctance in applications requiring a particular reluctance value, such as in applications where resonant coil 200 forms an inductive-capacitive resonant device. One possible material for use in a magnetic core is manganese zinc ferrite material, which has low losses at any frequency below about one megahertz, at flux densities up to about 200 milliteslas. Another possible material for use in a magnetic core is nickel zinc ferrite material, which has lower losses than manganese zinc ferrite material at higher frequencies. However, use of a magnetic core is not required. Additionally, in some alternate embodiments, such as in embodiments intended for use without a core, dielectric layers 206, 214 are solid disc shaped as opposed to annular shaped, such that resonant coil 200 does not form an aperture that extends along the entirety of thickness 204.

Although resonant coil 200 is illustrated as including three conductor layers 208, resonant coil 200 could be modified to have any number of conductor layers 208 greater than one. Additionally, resonant coil 200 could be modified to have one or more incomplete conductor layers 208, such as an incomplete conductor layer including first conductor sublayer 210 and sublayer dielectric layer 214 instances, but no second conductor sublayer 212 instance. Additionally, since dielectric layers 206, 214 need only separate adjacent conductor sublayers, in some alternate embodiments, dielectric layers 206, 214 have a notched annular shape similar to those of conductor sublayers 210, 212, where the dielectric layer notch is generally aligned with the notch of an adjacent conductor sublayer 210, 212. Furthermore, although each conductor sublayer 210, 212 instance is shown as having the same thickness 216, 218, thickness could vary among conductor sublayer instances, or even within a given conductor sublayer. For example, in a particular alternate embodiment including a magnetic core, conductor sublayers 210, 212 instances near the bottom of resonant coil 200 have greater thicknesses 216, 218 than conductor sublayer 210, 212 instances near the top of resonant coil 200, to promote low DC resistive losses within conductor sublayers 210, 212 without incurring excessive eddy-current-induced losses. In particular, the magnetic core causes conductor sublayer 210, 212 instances near the bottom of resonant coil 200 to be subject to less magnetic flux than conductor sublayer 210, 212 instances near the top of resonant coil 200, such that instances near the bottom of resonant coil 200 can be relatively thick without incurring excessive eddy-current losses.

Moreover, while it is anticipated that each sublayer dielectric layer 214 instance will typically have the same thickness 222, thickness 222 could vary among sublayer dielectric layer 214 instances without departing from the scope hereof. Similarly, separation dielectric layer 206 thicknesses 220 could either be the same or vary among separation dielectric layer 206 instances. Only some instances of thicknesses 216, 218, 230, 222 are labeled in FIG. 4 to promote illustrative clarity.

Figure 7:
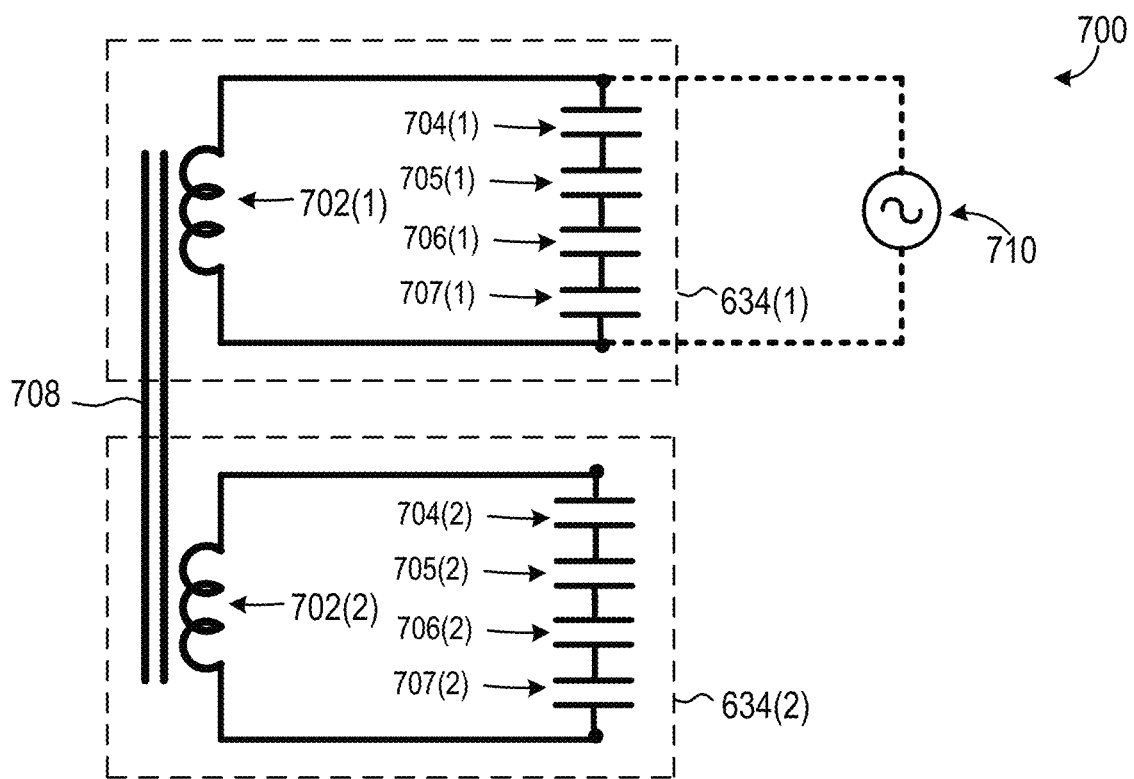
FIG. 7 is an electrical model of the FIG. 2 resonant coil.

Resonant coil 200 forms one or more sections 234, depending on the number of conductor layers 208, where each section 234 includes a respective instance of first conductor sublayer 210, second conductor sublayer 212, and separation dielectric layer 206. Accordingly, the embodiment illustrated in FIGS. 2-4 has two sections 234. FIG. 7 is an electrical model 700 of the illustrated embodiment of resonant coil 200. As shown in FIG. 7, each section 234 includes a winding turn 702 electrically coupled in parallel with four series-coupled capacitors 704, 705, 706 and 707. Winding turns 702 are magnetically coupled, as symbolically represented by a core 708. Core 708 is a magnetic core in embodiments where resonant coil 200 includes a magnetic core. On the other hand, in embodiments where resonant coil 200 does not include a magnetic core, core 708 represents magnetic coupling without use of a magnetic core, such that core 708 is an "air core." Proximity losses increase with increasing number of sections 234, while DC losses increase with decreasing number of sections 234. It should be noted that first conductor sublayer 210(1) and second conductor sublayer 212(3) do not materially contribute to the electrical characteristics of resonant coil 200 since these two conductor sublayers are not part of a section 234. Additionally, capacitance between first conductor sublayer 210(1) and second conductor sublayer 212(1), capacitance between first conductor sublayer 210(2) and second conductor sublayer 212(2), and capacitance between first conductor sublayer 210(3) and second conductor sublayer 212(3) are not shown in FIG. 7 because such capacitance is not materially excited and therefore does not significantly affect electrical characteristics of resonant coil 200.

Figure 8:
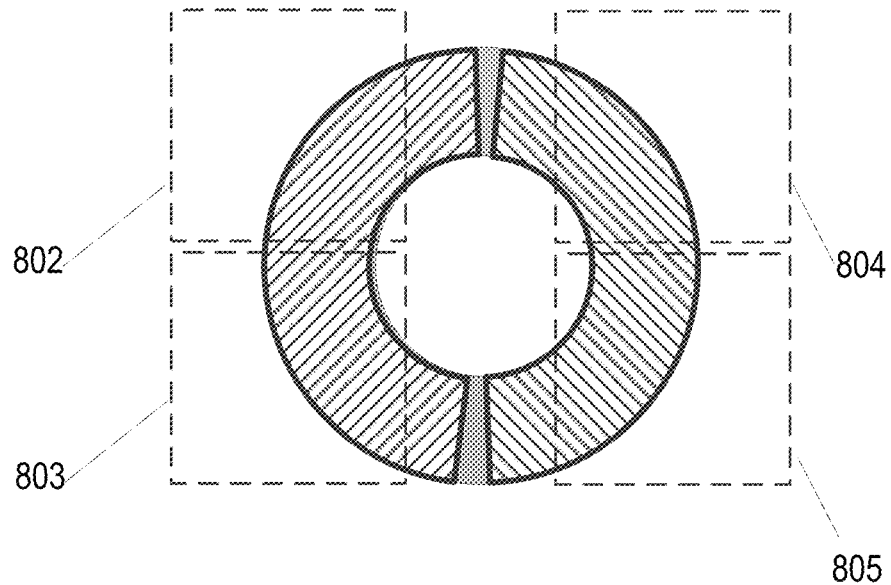
FIG. 8 is a top plan view of the FIG. 2 resonant coil with several portions approximately delineated by dashed lines.

FIG. 8 shows a top plan view of resonant coil 200 with left and right portions 802, 803, 804, and 805 of resonant coil 220 approximately delineated by dashed lines. Portions 802, 803, 804, and 805 are separated by notches 222, 224 in conductor sublayers 210, 212 (see FIGS. 5 and 6). Capacitor 704(1) represents capacitance between conductor sublayers 212(1), 210(2) in portion 802, and capacitor 704(2) represents capacitance between conductor sublayers 212(2), 210 (3) in portion 802. Capacitor 705(1) represents capacitance between conductor sublayers 212(1), 210(2) in portion 803, and capacitor 705(2) represents capacitance between conductor sublayers 212(2), 210(3) in portion 803. Capacitor 706(1) represents capacitance between conductor sublayers 212(1), 210(2) in portion 804, and capacitor 706(2) represents capacitance between conductor sublayers 212(2), 210 (3) in portion 804. Capacitor 707(1) represents capacitance between conductor sublayers 212(1), 210(2) in portion 805, and capacitor 707(2) represents capacitance between conductor sublayers 212(2), 210(3) in portion 805.

The capacitance values of capacitors 704-707 can be adjusted during the design of resonant coil 200, such as to achieve a desired resonance. For example, capacitance can be increased by decreasing separation dielectric layer 206 thickness 230 and/or by increasing surface area of overlapping portions of conductor sublayers 210, 212 within sections 234, such as by adjusting widths of notches 222, 224. Assuming symmetrical construction, the capacitance values of each capacitor 704-707 are essentially identical in each conductor layer 208.

An AC electric power source 710 is optionally electrically coupled to resonant coil 200 to drive the resonant coil, such that power source 710 and resonant coil 200 collectively form a system for generating a magnetic field, or such that power source 710 and resonant coil 200 form part of a resonant electrical circuit. AC electric power source 710 may be electrically coupled in parallel with conductor sublayers 210, 212 of one section 234, such that electric power source 710 is effectively electrically coupled in parallel with one winding turn 702. For example, AC electric power source 710 may be electrically coupled in parallel with conductor sublayers 212(1) and 210(2), such that source 710 is effectively electrically coupled in parallel with winding turn 702(1), as shown in FIG. 7. Although only one winding turn 702 is directly connected to AC electric power source 710 in the FIG. 7 example, the remaining winding turns 702 are also effectively coupled in parallel with source 710, due to magnetic coupling of winding turns 702. Each winding turn 702's capacitors 704-707, for example, collectively serve as a resonant capacitor electrically coupled in parallel with the winding turn.

While FIG. 7 shows AC electric power source 710 electrically coupled in parallel with winding turn 702(1), electric power source 710 could alternately be electrically coupled to one or more different conductor sublayers 210, 212. Furthermore, AC electrical power source 710 could be configured to indirectly drive resonant coil 200, such as via another winding that is separate from, but magnetically coupled to, resonant coil 200. For example, in certain embodiments, resonant coil 200 includes a magnetic core (not shown), and AC electrical power source 710 is electrically coupled to an additional winding wound around center axis 220 and disposed in thickness 204 direction between a last section 234 and the magnetic core, such that the additional winding is largely outside of the magnetic flux path of resonant coil 200. Such relative isolation of the additional winding from the magnetic flux path enables the additional winding to be formed of relatively thick metal to promote low DC resistive losses, without incurring excessive eddy-current-induced losses.

Figure 9:
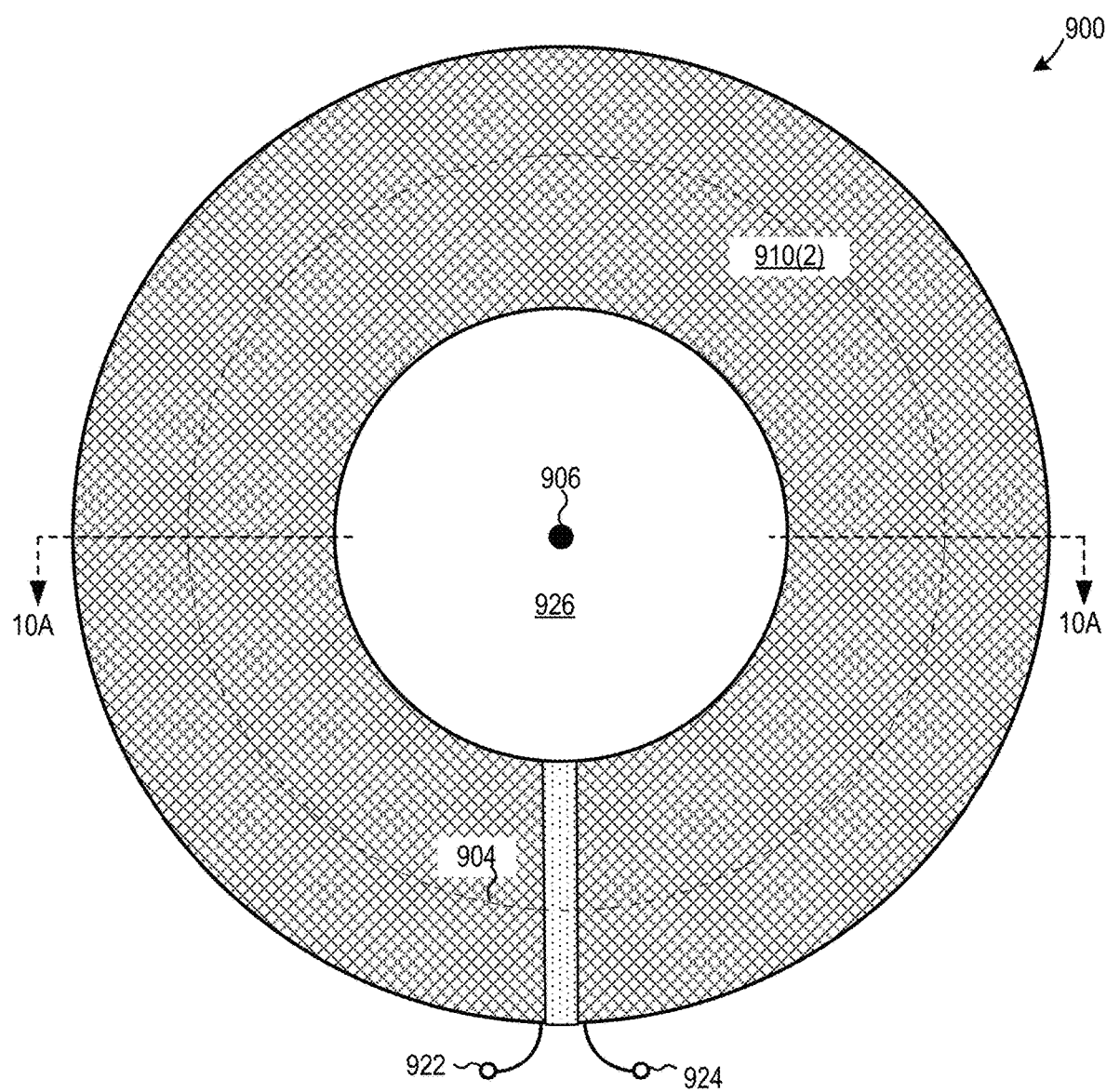
FIG. 9 is a top plan view of a resonant coil with integrated capacitance and including a plurality of concentric tubular conductor layers, according to an embodiment.
Figure 10:
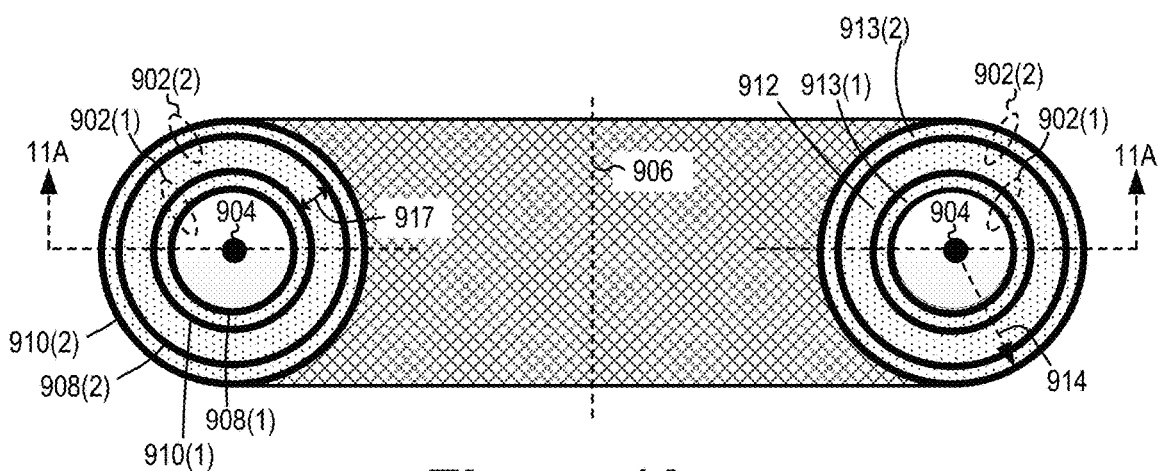
FIG. 10 is a cross-sectional view of the FIG. 9 resonant coil taken along line 10A-10A of FIG. 9.
Figure 11:
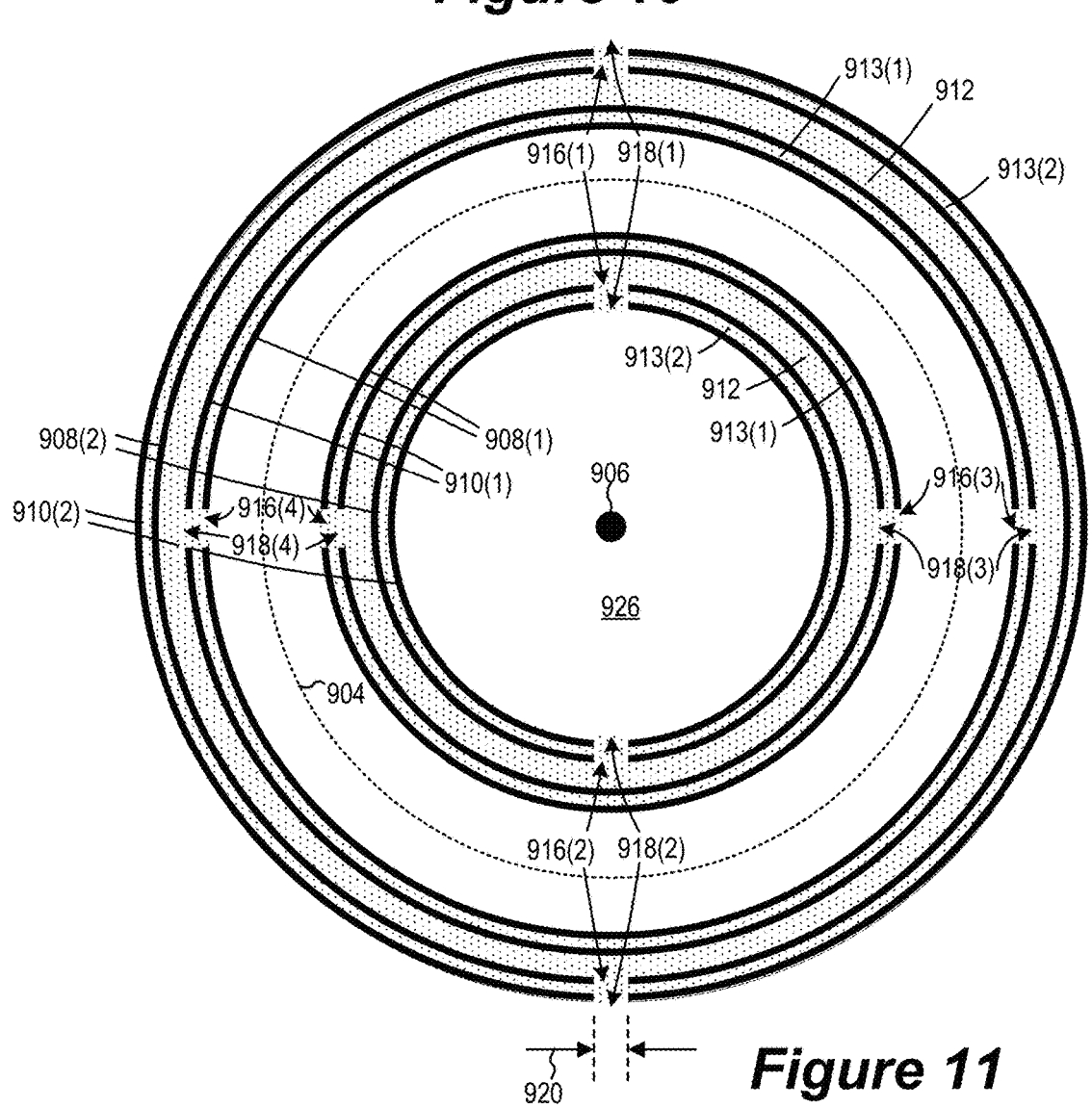
FIG. 11 is a cross-sectional view of the FIG. 9 resonant coil taken along line 11A-11A of FIG. 10.

Resonant coil 200 could be modified to have a different geometry without departing from the scope hereof, as long as conductor sublayers 210, 212 within each conductor layer 208 have a common orientation, and adjacent conductor layers 208 have different orientations. For example, first and second conductor sublayers 210, 212 could be modified to have a rectangular shape instead of a ring shape. As another example, FIG. 9 is a top plan view of a resonant coil 900 with integrated capacitance and including a plurality of concentric tubular conductor layers. FIG. 10 is a cross-sectional view of resonant coil 900 taken along line 10A-10A of FIG. 9, and FIG. 11 is a cross-sectional view of resonant coil 900 taken along line 11A-11A of FIG. 10. Resonant coil 900 includes a plurality of tubular conductor layers 902 concentrically stacked around a common axis 904 in a radial 914 direction extending from common axis 904. Although resonant coil 900 is illustrated as including two tubular conductor layers 902, resonant coil 900 could include additional tubular conductor layers 902 without departing from the scope hereof. Common axis 904 forms a loop around a center axis 906 of resonant coil 900, such that resonant coil 900 has a toroidal shape.

Each tubular conductor layer 902 includes a first tubular conductor sublayer 908 and a second tubular conductor sublayer 910 concentrically stacked around common axis 904. In some embodiments, first and second tubular conductor sublayers 908, 910 are formed of conductive foil or conductive film. The conductive foil or film typically has a thickness smaller than or close to its skin depth at an intended operating frequency, thereby promoting efficient use of foil conductor sublayers 908, 910 and corresponding low power loss. In some embodiments, thickness of the foil or conductive film is inversely proportional to the square root of the number of tubular conductor layers 902, such that thickness decreases as the number of tubular conductor layers increases. A separation dielectric layer 912 separates each pair of adjacent tubular conductor layers 902 in the radial 914 direction. Consequentially, tubular conductor layers 902 and separation dielectric layers 912 are concentrically stacked in an alternating manner in the radial direction. A sublayer dielectric layer 913 separates adjacent first and second tubular conductor sublayers 908, 910 in the radial 914 direction within each tubular conductor layer 902.

Each first tubular conductor sublayer 908 forms a first discontinuity 916, and each second tubular conductor sublayer 910 forms a second discontinuity 918, in the toroidal direction, so that conductor sublayers 908, 910 do not completely encircle center axis 906, as illustrated in FIG. 11. Within each tubular conductor layer 902 instance, first and second discontinuities 916, 918 are angularly aligned with respect to center axis 906, such that first and second tubular conductor sublayers 908, 910 have a common alignment. Consequently, there is minimal electric field to excite capacitance between first and second tubular conductor sublayers 908, 910 within a given tubular conductor layer 902. Therefore, sublayer dielectric layer 913 can be formed of low-cost, industry standard dielectric materials having relatively high-loss, such as FR4 or polyimide, without negatively impacting performance. Additionally, thickness of sublayer dielectric layer 913 can be varied during the design of resonant coil 900 without materially affecting electrical properties of the coil.

Tubular conductor layers 902 having alternating opposing orientations, to excite capacitance between adjacent tubular conductor layers 902 and thereby achieve integrated capacitance of resonant coil 900. In particular, first tubular conductor layer 902(1) has a first orientation with discontinuities 916(3), 918(3), 916(4), and 918(4) at about zero degrees and 180 degrees with respect to center axis 906. Second tubular conductor layer 902(2) has an opposite second orientation with discontinuities 916(1), 918(1), 916(2), and 918(2) at about 90 degrees and 270 degrees with respect to center axis 906. A third tubular conductor layer 902 (not shown) would have the first orientation, a fourth tubular conductor layer 902 (not shown) would have the second orientation, and so on. Adjacent tubular conductor layers 902 may be angularly offset from each other at angles other than 90 degrees without departing from the scope hereof, as long as adjacent tubular conductor layers 902 have different orientations. Separation dielectric layers 912 must be formed of a relatively low-loss dielectric material, such as PTFE, PFA, ETFE, FEP, polypropylene, polyethylene, polystyrene, glass, or ceramic, to achieve high performance, because there is significant electric field between conductor tubular layers 902 during operation of resonant coil 900.

Capacitance of resonant coil 900 is proportional to the area of overlap of adjacent tubular conductor layers 902. Accordingly, capacitance values can be adjusted during the design of resonant coil 900 by varying the respective widths 920 of first and second discontinuities 916, 918 in the toroidal direction. (See FIG. 11). For instance, if smaller capacitance values are desired, widths 920 of first and second discontinuities 916, 918 can be made larger. Although it is anticipated that each first and second sets of discontinuities 916, 918 will have the same width 920, it is possible for discontinuity width 920 to vary among tubular conductor layer 902 instances without departing from the scope hereof. Capacitance is also inversely proportional to radial separation 917 of adjacent tubular conductor layers 902 (see FIG. 10), and capacitance can therefore be adjusted during resonant coil 900's design by varying radial separation distance 917. Although it is anticipated that each pair of adjacent tubular conductor layer 902 instances will typically be separated by the same radial separation 917, it is possible for the radial separation 917 to vary among pairs of adjacent tubular conductor layer 902 instances without departing from the scope hereof. Furthermore, capacitance can be adjusted during resonant coil 900's design by adding additional discontinuities in conductor sublayers 908 and 910.

In the embodiment of FIGS. 9-10, common axis 904 forms a circle around center axis 906 such that common axis 904 forms a closed loop, as illustrated in FIGS. 9 and 11, and each tubular conductor sublayer 908, 910 has a circular cross-section perpendicular to common axis 904, such that resonant coil 900 has a toroidal shape. However, the shape of the loop formed by common axis 904 and/or the cross-sectional shape of tubular conductor sublayers 908, 910 could be varied without departing from the scope hereof. For example, in one alternate embodiment, common axis 904 forms a non-planar closed loop.

The fact that first and second tubular conductor sublayers 908, 910 do not completely encircle center axis 906 causes current to flow through resonant coil 900 in the direction of common axis 904, or in other words, causes current to flow in the toroidal direction. Resonant coil 900 optionally includes electrical terminals 922, 924 electrically coupled to opposing ends of second tubular conductor sublayer 910(2), as illustrated in FIG. 9, to provide electrical access to resonant coil 900. A magnetic field generated by current flowing through second tubular conductor sublayer 910(2) induces current through the remaining first and second tubular conductor sublayers 908, 910, and it therefore may be unnecessary to couple the other tubular conductor sublayers to electrical terminals. However, alternate or additional tubular conductor sublayers could be electrically coupled to electrical terminals 922, 924 without departing from the scope hereof.

A magnetic core (not shown) is optionally disposed partially or completely around resonant coil 900 to achieve a desired reluctance and/or to help contain the magnetic field. For example, in some embodiments, a cylindrical magnetic core is disposed in center 926 of resonant coil 900. In applications where resonant coil 900 forms a resonant induction coil for induction heating, it is expected that the workpiece would be disposed in center 926 to realize maximum magnetic field strength at the workpiece location. The magnetic field also extends along center axis 906, decreasing in magnitude with distance above resonant coil 900. In some resonant induction coil applications, the magnetic field in the region above resonant coil 900 is used, for example, for wireless power transfer or for magnetic hyperthermia.

Figure 12:
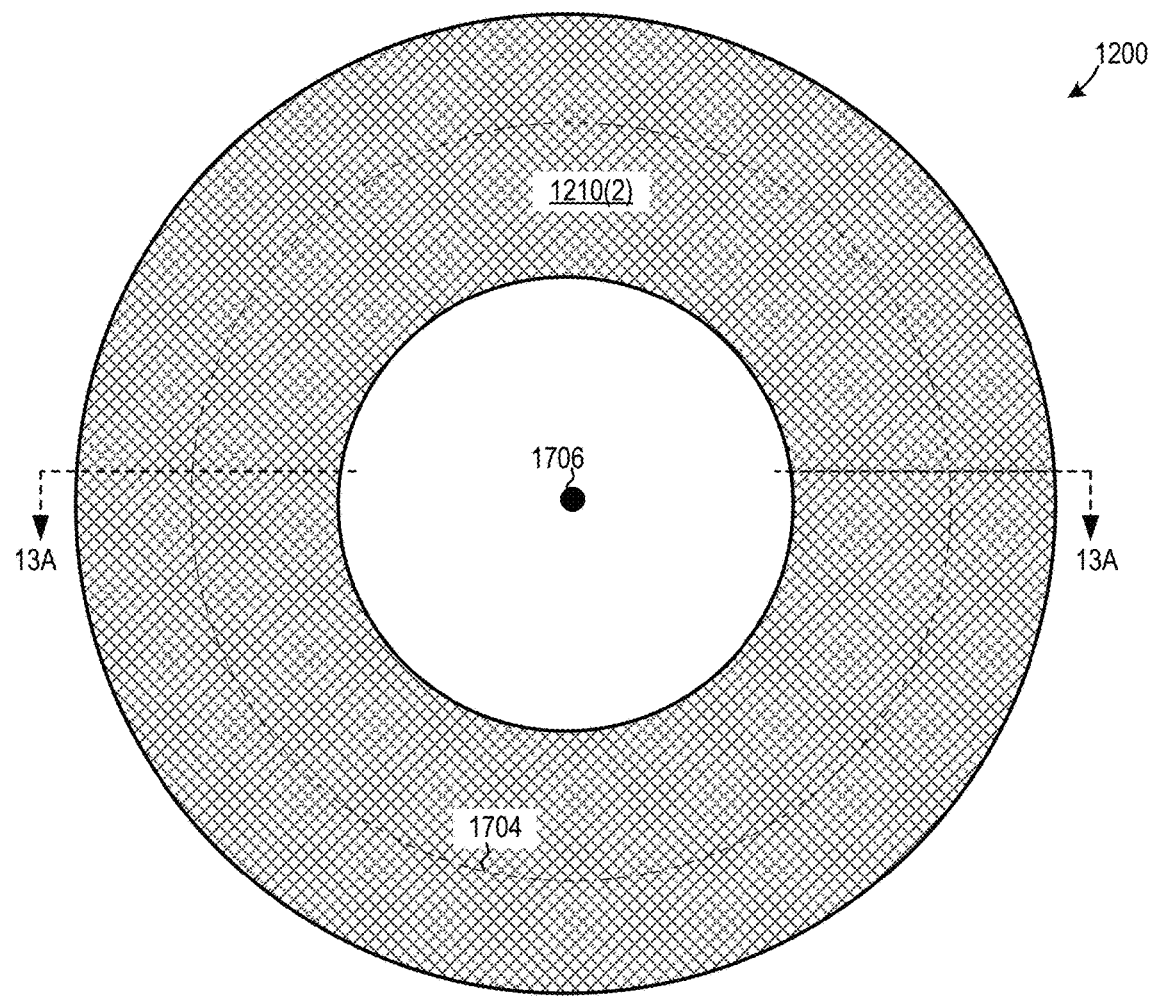
FIG. 12 is a top plan view of another resonant coil with integrated capacitance including a plurality of concentric tubular conductor layers, according to an embodiment.
Figure 13:
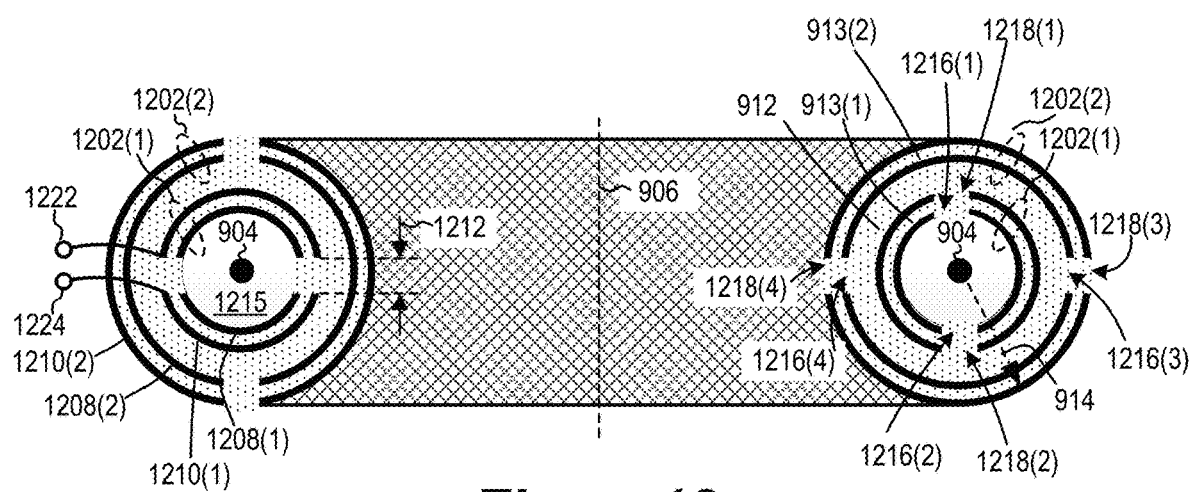
FIG. 13 is a cross-sectional view of the FIG. 12 resonant coil taken along line 13A-13A of FIG. 12.

FIG. 12 is a top plan view of a resonant coil 1200 with integrated capacitance including a plurality of concentric tubular conductor layers, and FIG. 13 is a cross-sectional view of resonant coil 1200 taken along line 13A-13A of FIG. 12. Resonant coil 1200 is similar to resonant coil 900 of FIGS. 9-11, but with tubular conductor layers 902 replaced with tubular conductor layers 1202. As discussed below, tubular conductor sublayer discontinuities of resonant coil 1200 are formed along poloidal axes such that each tubular conductor sublayer does not completely encircle common axis 904, so that the current flow and magnetic field paths of resonant coil 1200 differ from those of resonant coil 900.

Each tubular conductor layer 1202 includes a first tubular conductor sublayer 1208 and a second tubular conductor sublayer 1210 concentrically stacked around common axis 904 in the radial 914 direction. In some embodiments, first and second tubular conductor sublayers 1208, 1210 are formed of conductive foil or conductive film. The conductive foil or film typically has a thickness smaller than, or close to, its skin depth at an intended operating frequency, thereby promoting efficient use of foil conductor sublayers 1208, 1210 and corresponding low power loss. In some embodiments, thickness of the foil or conductive film is inversely proportional to the square root of the number of tubular conductor layers 1202, such that thickness decreases as the number of tubular conductor layers increases. A separation dielectric layer 912 separates each pair of adjacent tubular conductor layers 1202, and a sublayer dielectric layer 913 separates first and second tubular conductor sublayers 1208, 1210 within each tubular conductor layer.

Each first tubular conductor sublayer 1208 forms a pair of notches or discontinuities 1216, and each second tubular conductor sublayer 2010 forms a second pair of notches or discontinuities 1218, so that each tubular conductor sublayer 1208, 1210 does not completely encircle common axis 904, as illustrated in FIG. 13. Within each tubular conductor layer 1202 instance, first and second sets of discontinuities 1216, 1218 are angularly aligned with respect to common axis 904, such that first and second tubular conductor sublayers 1208, 1210 have a common alignment. Consequently, there is minimal electric field to excite capacitance between first and second tubular conductor sublayers 1208, 1210, within a given tubular conductor layer 1202. Therefore, sublayer dielectric layer 913 can be formed of low-cost, industry standard dielectric materials having relatively high-loss, such as FR4 or polyimide, without negatively impacting performance. Additionally, thickness of sublayer dielectric layer 913 can be selected as desired without materially affecting electrical properties of resonant coil 1200.

Tubular conductor layers 1202 have alternating opposing orientations, to excite capacitance between adjacent tubular conductor layers and thereby achieve integrated capacitance of resonant coil 1200. In particular, first tubular conductor layer 1202(1) has a first orientation with discontinuities 1216(1), 1218(1), 1216(2), and 1218(2) at about zero degrees and 180 degrees with respect to common axis 904, and second conductor layer 1202(2) has an opposite second orientation with discontinuities 1216(3), 1218(3), 1216(4), and 1218(4) at about 90 degrees and 270 degrees with respect to common axis 904. A third conductor layer 1202 (not shown) would have the first orientation, a fourth conductor layer 1202 (not shown) would have the second orientation, and so on. Adjacent tubular conductor layers 1202 may be angularly offset from each other at angles other than 90 degrees without departing from the scope hereof, as long as adjacent tubular conductor layers 1202 have different orientations. Separation dielectric layers 912 must be formed of a relatively low-loss dielectric material, such as PTFE, PFA, ETFE, FEP, polypropylene, polyethylene, polystyrene, glass, or ceramic, to achieve high performance, because there is significant electric field between conductor tubular layers 1202 during operation of resonant coil 1200.

Capacitance values can be adjusted during the design of resonant coil 1200 by varying the respective widths 1212 of first and second discontinuities in the poloidal direction, in a manner similar to that discussed above with respect to resonant coil 900. Additionally, capacitance can be adjusted during resonant coil 1200's design by varying the radial 914 separation of tubular conductor layers 1202, similar to as discussed above with respect to resonant coil 900. Furthermore, capacitance can be adjusted during resonant coil 1200's design by adding additional discontinuities in conductor sublayers 1208 and 1210.

The fact that first and second sets of discontinuities 1216, 1218 do not completely encircle common axis 904 causes current to flow through resonant coil 1200 around common axis 904, or in other words, causes current to flow in the poloidal direction. The magnetic field, in turn, is directed along common axis 904, or in other words, in the toroidal direction, within a center portion 1215 of concentric tubular conductor layers 1202. A magnetic core (not shown) is optionally disposed within center 1215 of tubular conductor layers 1202 to achieve a desired reluctance. Resonant coil 1200 optionally includes electrical terminals 1222, 1224 electrically coupled to opposing ends of second tubular conductor sublayer 1210(1), as illustrated in FIG. 13, to provide electrical access to resonant coil 1200. A magnetic field generated by current flowing through second tubular conductor sublayer 2010(2) induces current through the remaining first and second tubular conductor sublayers 1208, 1210, and it therefore may be unnecessary to couple the other tubular conductor sublayers to electrical terminals. However, alternate or additional tubular conductor sublayers could be electrically coupled to electrical terminals without departing from the scope hereof.

Figure 14:
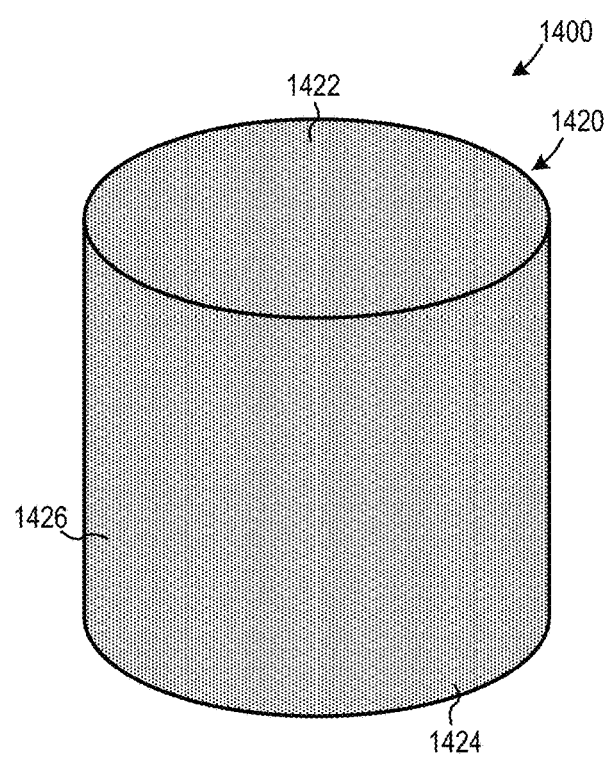
FIG. 14 is a perspective view of a magnetic device including a resonant coil with integrated capacitance, according to an embodiment.
Figure 15:
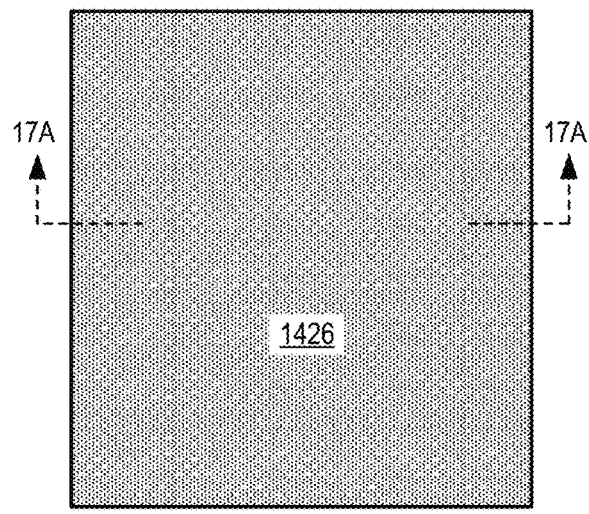
FIG. 15 is a side elevational view of the FIG. 14 magnetic device.
Figure 16:
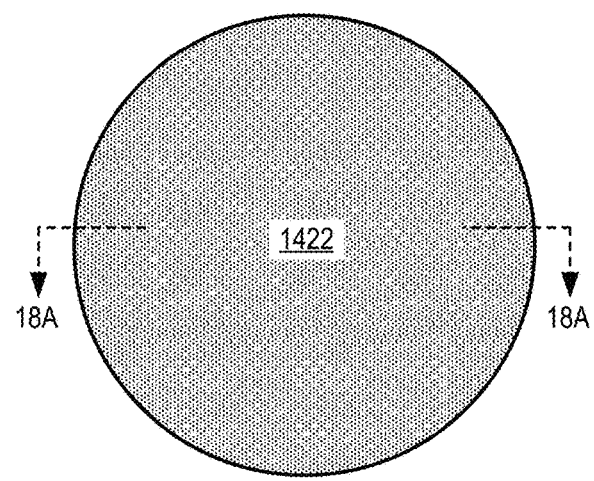
FIG. 16 is a top plan view of the FIG. 14 magnetic device.
Figure 17:
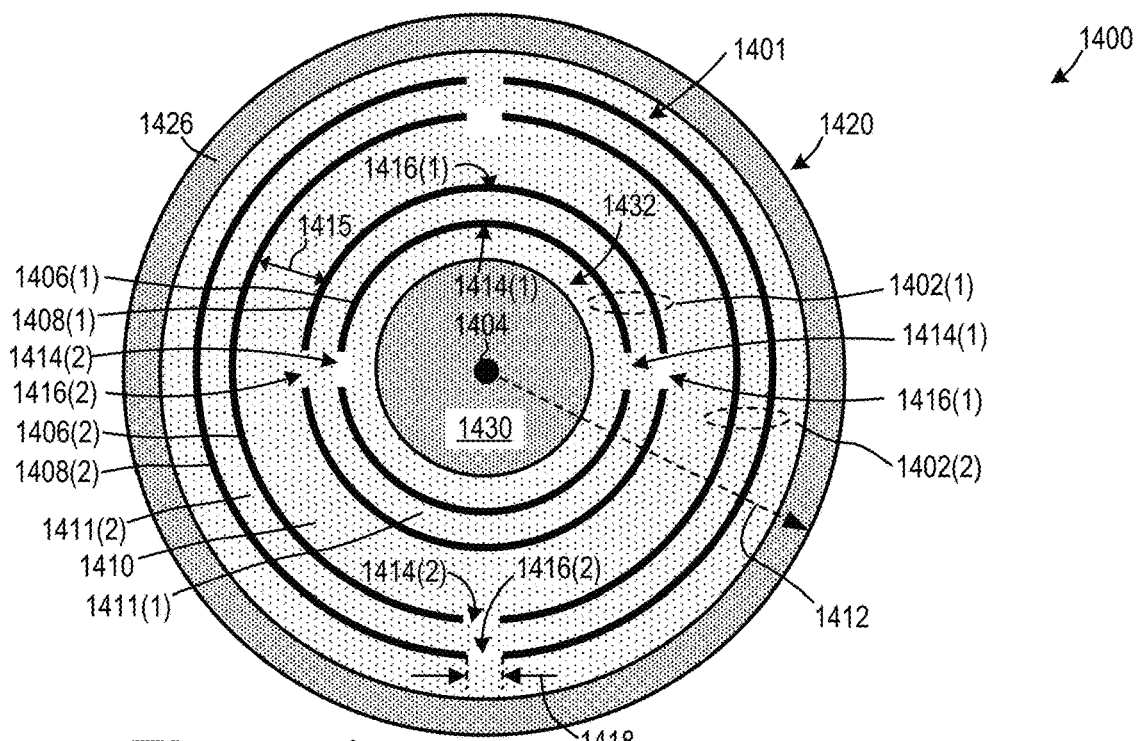
FIG. 17 is a cross-sectional view of the FIG. 14 magnetic device taken along line 17A-17A of FIG. 15.
Figure 18:
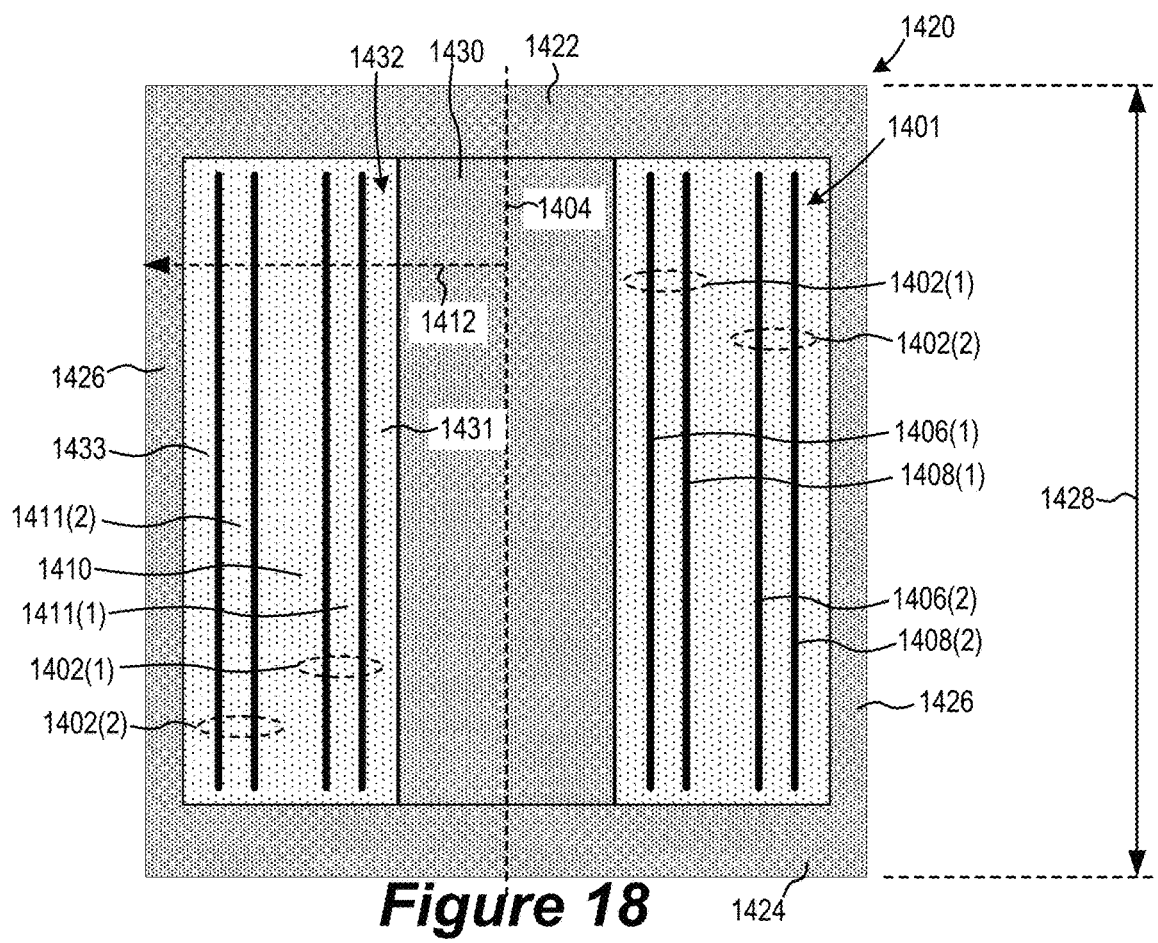
FIG. 18 is a cross-sectional view of the FIG. 14 magnetic device taken along line 18A-18A of FIG. 16.

FIGS. 14-18 illustrate a magnetic device 1400 including a resonant coil 1401 with integrated capacitance. FIG. 14 is a perspective view of magnetic device 1400, FIG. 15 is a side elevational view of magnetic device 1400, and FIG. 16 is a top plan view of magnetic device 1400. FIG. 17 is a cross-sectional view of magnetic device 1400 taken along line 17A-17A of FIG. 15, and FIG. 18 is a cross-sectional view of the magnetic device along line 18A-18A of FIG. 16.

Resonant coil 1401 includes a plurality of tubular conductor layers 1402 concentrically stacked around a common or center axis 1404 in a radial 1412 direction, as illustrated in FIGS. 17 and 18. Resonant coil 1401 has a cylindrical shape as seen when viewed cross-sectionally along center axis 1404. Although resonant coil 1401 is illustrated as including two tubular conductor layers 1402, resonant coil 1401 could include additional tubular conductor layers 1402 without departing from the scope hereof. Each tubular conductor layer 1402 includes a first tubular conductor sublayer 1406 and a second tubular conductor sublayer 1408 concentrically stacked in the radial 1412 direction around center axis 1404. In some embodiments, first and second tubular conductor sublayers 1406, 1408 are formed of conductive foil or conductive film. The conductive foil or film typically has a thickness smaller than, or close to, its skin depth at an intended operating frequency, thereby promoting efficient use of foil conductor sublayers 1406, 1408 and corresponding low power loss. In some embodiments, thickness of the foil or conductive film is inversely proportional to the square root of the number of tubular conductor layers 1402, such that thickness decreases as the number of tubular conductor layers increases. A separation dielectric layer 1410 separates each pair of adjacent tubular conductor layers 1402 in the radial 1412 direction. Consequentially, tubular conductor layers 1402 and separation dielectric layers 1410 are concentrically stacked around center axis 1404. A sublayer dielectric layer 1411 separates adjacent first and second tubular conductor sublayers 1406, 1408 in the radial 1412 direction within each tubular conductor layer.

Each first tubular conductor sublayer 1406 forms a first set of notches or discontinuities 1414, such that the first tubular conductor sublayer does not completely encircle center axis 1404, as illustrated in FIG. 17. Similarly, each second tubular conductor sublayer 1408 forms a second set of notches or discontinuities 1416, such that the second tubular conductor sublayer does not completely encircle center axis 1404, as also illustrated in FIG. 17. First and second tubular conductor sublayers 1406 and 1408 could form additional discontinuities without departing from the scope hereof. Although discontinuities 1414 and 1416 are illustrated as being filled with air, discontinuities 1414 and 1416 could be filled with another material, such as material forming sublayer dielectric layers 1411 or material forming separation dielectric layers 1410, without departing from the scope hereof. Within each tubular conductor layer 1402 instance, first and second sets of discontinuities 1414, 1416 are angularly aligned with respect to center axis 1404, such that first and second tubular conductor sublayers 1406, 1408 have a common alignment. Consequently, there is minimal electric field to excite capacitance between first and second tubular conductor sublayers 1406, 1408, within a given tubular conductor layer 1402. Therefore, sublayer dielectric layer 1411 can be formed of low-cost, industry standard dielectric materials having relatively high-loss, such as FR4 or polyimide, without negatively impacting performance. Additionally, thickness of sublayer dielectric layer 1411 can be selected as desired without materially affecting electrical properties of resonant coil 1401.

Tubular conductor layers 1402 have alternating opposing orientations, to excite capacitance between adjacent tubular conductor layers and thereby achieve integrated capacitance of resonant coil 1400. In particular, first tubular conductor layer 1402(1) has a first orientation with discontinuities 1414(1), 1416(1), 1414(2), and 1416(2) at about 90 degrees and 270 degrees with respect to center axis 1404, and second conductor layer 1402(2) has an opposite second orientation with discontinuities 1414(3), 1416(3), 1414(4), and 1416(4) at about zero degrees and 180 degrees with respect to center axis 1404. A third tubular conductor layer 1402 (not shown) would have the first orientation, a fourth tubular conductor layer 1402 (not shown) would have the second orientation, and so on. Adjacent tubular conductor layers 1402 may be angularly offset from each other at angles other than 90 degrees without departing from the scope hereof, as long as adjacent tubular conductor layers 1402 have different orientations. Separation dielectric layers 1410 must be formed of a relatively low-loss dielectric material, such as PTFE, PFA, ETFE, FEP, polypropylene, polyethylene, polystyrene, glass, or ceramic, to achieve high performance, because there is significant electric field between conductor tubular layers 1402 during operation of resonant coil 1401

Capacitance values can be adjusted during the design of resonant coil 1401 by varying the respective widths 1418 of first and second sets of discontinuities 1414, 1416, in a manner similar to that discussed above with respect to resonant coil 900. Additionally, capacitance can be adjusted during resonant coil 1401's design by varying radial 1412 separation distance 1415 of the tubular conductor sublayers, similar to as discussed above with respect to resonant coil 900. Furthermore, capacitance can be adjusted during resonant coil 1401's design by increasing the number of discontinuities in tubular conductor sublayers 1406 and 1408.

Although not required, magnetic device 1400 typically includes a magnetic core 1420 enclosing tubular conductor layers 1402 to help achieve desired reluctance, to help contain a magnetic field generated by current flowing through tubular conductor layers 1402, and/or to influence the shape of the magnetic field lines in the region of tubular conductor layers 1402 to be substantially parallel to the layers. For example, in some embodiments, magnetic core 1420 has a hollow cylindrical shape and is centered with respect to center axis 1404, as illustrated in FIGS. 17 and 18. In these embodiments, magnetic core 1420 includes a first end magnetic element 1422, a second end magnetic element 1424, and an outer ring 1426. First end magnetic element 1422 opposes second end magnetic element 1424 in a thickness 1428 direction parallel to center axis 1404. Outer ring 1426 is centered with respect to center axis 1404, and outer ring 1426 also joins first and second end magnetic elements 1422, 1424 in the thickness 1428 direction. Accordingly, resonant coil 1401 is disposed between first and second end magnetic elements 1422, 14224 and within outer ring 1426.

A magnetic center post 1430 is disposed in a center 1432 of tubular conductor layers 1402 along center axis 1404. Magnetic center post 1430 at least partially joins first and second end magnetic elements 1422, 1424 in the thickness 1428 direction. Magnetic flux generated by current flowing through tubular conductor layers 1402 flows in a loop through magnetic center post 1430, first end magnetic element 1422, outer ring 1426, and second end magnetic element 1424. Although not required, additional dielectric material 1431, 1433 typically separates tubular conductor layers 1402 from magnetic center post 1430 and outer ring 1426, respectively. Although FIG. 18 delineates magnetic center post 1430 from first end magnetic element 1422 and second end magnetic element 1424 to help the viewer distinguish the magnetic center post from the end magnetic elements, the magnetic center post could be joined with one or more of the end magnetic elements without departing from the scope hereof. Additionally, although outer ring 1426 and end magnetic elements 1422, 1424 are illustrated as being part of a single-piece magnetic core, magnetic core 1420 could be formed from two or more magnetic pieces that are joined together.

Magnetic center post 1430 could have the same composition as magnetic core 1420 to simplify construction. Alternately, magnetic center post 1430 could have a different composition from magnetic core 1420, such as to help achieve a desired reluctance. For example, in some embodiments, magnetic core 1420 is formed of a high permeability ferrite material, and magnetic center post 1430 is formed of a lower permeability material including magnetic materials disposed in a non-magnetic binder, such that the magnetic center post has a distributed non-magnetic "gap." In these embodiments, a desired reluctance is achieved, for example, by adjusting the ratio of magnetic material and non-magnetic binder forming magnetic center post 1430.

Magnetic center post 1430 could also form a discrete gap (not shown) filled with non-magnetic material, or with material having a lower magnetic permeability than the remainder of the magnetic center post, to help achieve a desired reluctance. However, a single gap may cause magnetic field lines, which generally flow in the thickness 1428 direction through magnetic center post 1430, to curve in the vicinity of the gap, such that the magnetic field lines induce eddy current losses in tubular conductor layers 1402. Such eddy-current losses can be reduced by forming a quasi-distributed gap from multiple small gaps (not shown), instead of a single large gap, in magnetic center post 1430. Additionally, magnetic center post 1430 could even be completely omitted. In some embodiments, any one or any combination of end magnetic elements 1422, 1424, outer ring 1426 and magnetic center post 1430 can be wholly or partially omitted. Any one or any combination of end magnetic elements 1422, 1424, outer ring 1426 and magnetic center post 1430, may also be posited together with any of resonant coils 200, 900, 2200, 3200, or resonant coils with integrated capacitance. For example, resonant coil 200, with the center post 1430, the end magnetic element 1424 and the outer ring 1426 can be used for wireless power transfer among other applications.

In an alternate embodiment of device 1400, first and second end magnetic elements 1422, 1424 are each formed of a high permeability magnetic material, and outer ring 1426 and magnetic center post 1430 are each formed of a low permeability magnetic material. The low permeability magnetic material in this embodiment includes, for example, a low permeability homogenous magnetic material, a low permeability composite magnetic material, a high permeability magnetic material including multiple gaps forming a quasi-distributed gap, or air.

Device 1400 optionally includes electrical terminals (not shown) electrically coupled to opposing ends of one or more tubular conductor sublayers 1406, 1408, to provide electrical access to resonant coil 1401. A magnetic field generated by current flowing through one tubular conductor sublayer 1406 or 1408 induces current through the remaining first and second tubular conductor sublayers 1406, 1408. Therefore, it may be unnecessary to couple all other tubular conductor sublayers to electrical terminals.

Although magnetic device 1400 is shown as being cylindrical, it could alternately have a different shape without departing from the scope hereof. For example, tubular conductor layers 1402 could alternately have an oval or rectangular cross-section, instead of a circular cross-section, as seen when viewed cross-sectionally along line 17A-17A of FIG. 15. Additionally, although magnetic center post 1430 is illustrated as having a cylindrical shape, it could also have a different shape without departing from the scope hereof.

Figure 19:
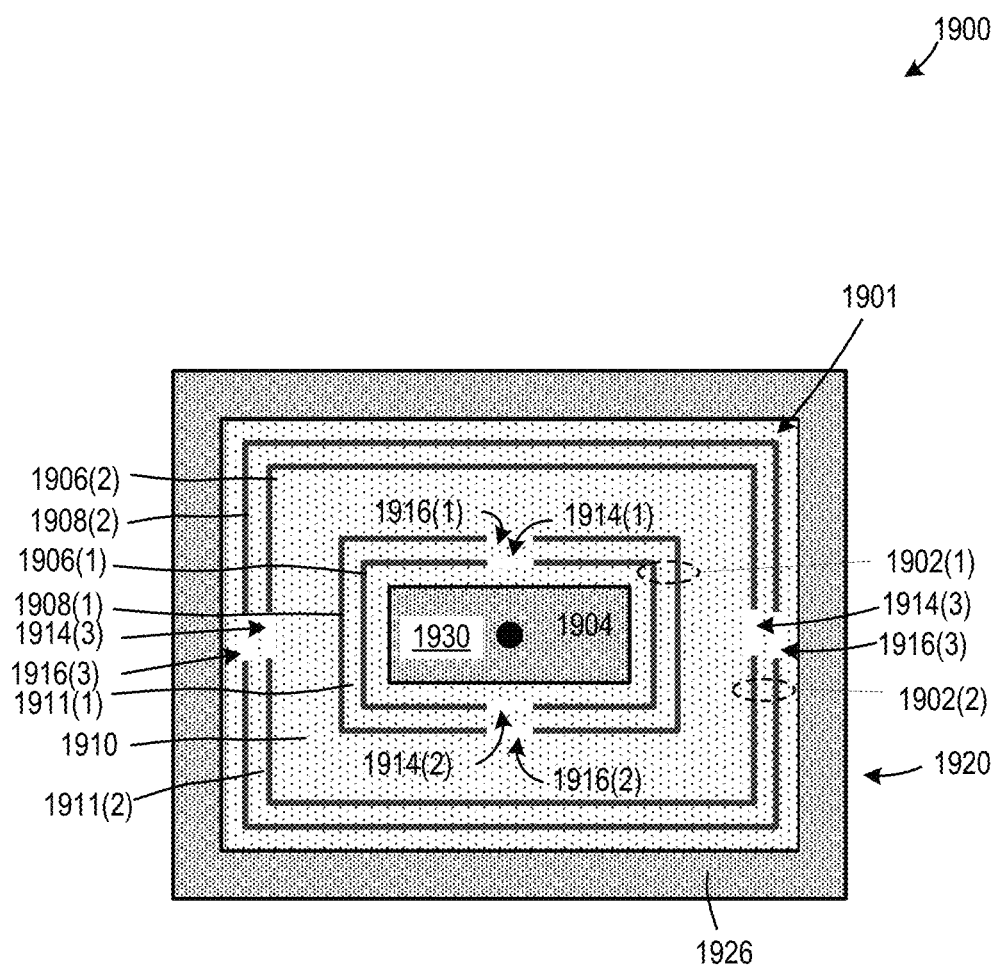
FIG. 19 is a cross-sectional view of an alternate embodiment of the FIG. 14 magnetic device having a rectangular cross-section.

For instance, FIG. 19 is a cross-sectional view analogous to FIG. 17 of a magnetic device 1900 including a resonant coil 1901 with integrated capacitance. Magnetic device 1900 is one alternate embodiment of device 1400 having a rectangular shape, as seen when viewed cross-sectionally along a common or center axis 1904. Magnetic device 1900 includes a plurality of tubular conductor layers 1902 concentrically stacked around a common or center axis 1904, where each tubular conductor layer 1902 includes a first tubular conductor sublayer 1906 and a second tubular conductor sublayer 1908 concentrically stacked around center axis 1904. A separation dielectric layer 1910 separates each pair of adjacent tubular conductor layers 1902, and a sublayer dielectric layer 1911 separates adjacent first and second tubular conductor sublayers 1906, 1908 within each tubular conductor layer. Each first tubular conductor sublayer 1906 forms a first set of notches or discontinuities 1914, and each second tubular conductor sublayer 1908 forms a second set of notches or discontinuities 1916. Although discontinuities 1914 and 1916 are illustrated as being filled with air, discontinuities 1914 and 1916 could be filled with another material, such as material forming sublayer dielectric layers 1911 or material forming separation dielectric layers 1910, without departing from the scope hereof. Within each tubular conductor layer 1902 instance, first and second sets of discontinuities 1914, 1916 are angularly aligned with respect to center axis 1904, such that first and second tubular conductor sublayers 1906, 1908 have a common alignment. Tubular conductor layers 1902 have alternating opposing orientations, to excite capacitance between adjacent tubular conductor layers and thereby achieve integrated capacitance of resonant coil 1900. Tubular conductor layers 1902, dielectric layer 1910, and sublayer dielectric layers 1911 are analogous to tubular conductor layers 1402, dielectric layer 1410, and sublayer dielectric layers 1411, respectively, of device 1400. Device 1900 could include additional tubular conductor layers 1902 without departing from the scope hereof.

Figure 20:
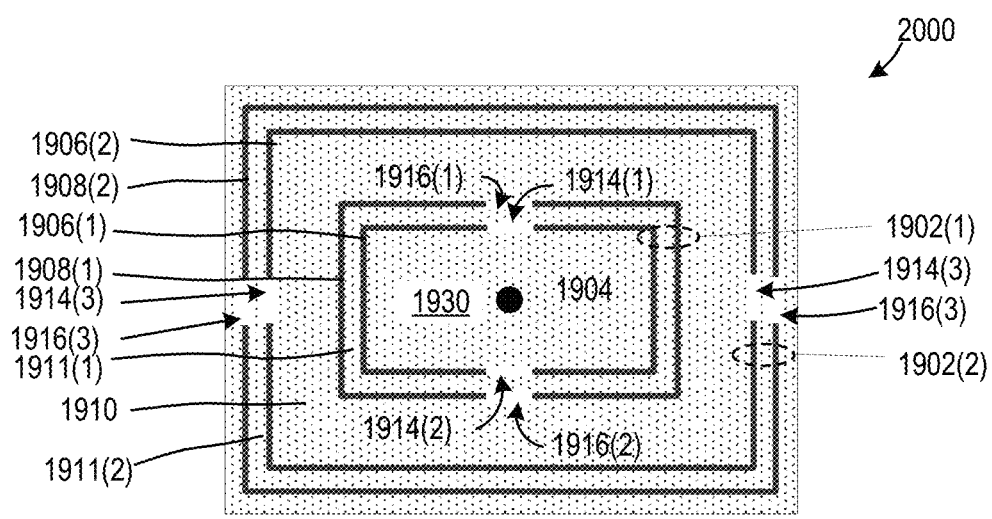
FIG. 20 is a cross-sectional view of an alternate embodiment of the FIG. 19 magnetic device with a magnetic core omitted.

Although not required, device 1900 typically includes a magnetic core 1920 analogous to magnetic core 1420 of device 1400. Magnetic core 1920 includes a rectangular hollow outer magnetic element 1926 joining first and second end magnetic elements (not shown) in the thickness direction. A magnetic center post 1930 at least partially joins the first and second end magnetic elements in the thickness direction. FIG. 20 is a cross-sectional view of a device 2000 which is like device 1900 but with magnetic core 1920 and magnetic center post 1930 omitted. The resonant coils discussed above have a parallel-resonant electric topology, i.e., with integrated capacitance electrically coupled in parallel with winding turns, as symbolically illustrated in the FIG. 7 electrical model. However, any of the resonant coils discussed above could be modified to have a series-resonant electric topology, i.e. with the integrated capacitance effectively coupled in series with the winding turns.

FIG. 21 is a cross-sectional view of a resonant coil 2100, which is an alternate embodiment of resonant coil 200 (FIGS. 2-4) and is configured to have a series-resonant electrical topology. The position of the FIG. 21 cross-section is analogous to that of FIG. 4. Resonant coil 2100 includes three conductor layers 2108 concentrically stacked in an alternating manner, with an angular offset, around a center axis 2120 in a thickness 2104 direction, with adjacent conductor layers 2108 separated from each other in the thickness direction by a separation dielectric layer 206. Each conductor layer 2108 includes two instances of first conductor sublayer 210 separated in the thickness 2104 direction by a sublayer dielectric layer 214. First conductor sublayers 210 could be replaced with second conductor sublayers 212 without departing from the scope hereof.

The resonant coil 2100 may be constructed, in some embodiments, by cutting the resonant coil 200 along the notches 222, 224 of some conductor layer instances, such that the cut goes through the notches 222, 224 of some conductor layer 208 instances, while the cut goes through the conductor material of the conductor sublayers 210, 212 in other conductor layer 208 instances. The conductor layer 208 instances in which the cut goes through the conductor material of the conductor sublayers 210, 212 are soldered via a solder connection 2152 on one end of the cut and a solder connection 2158 at the other end of the cut. The conductor layer 208 instances in which the cut goes through the notches 222, 224 are not soldered together via solder connections 2152 or 2158, and are left floating. The conductor layers with the solder connections are connected to electrode 2150 via solder connection 2152 and to electrode 2154 via solder connection 2158, forming opposite ends of a resonant coil. Similar construction of other resonant coil embodiments such as 200, 900, 1200, 1400, 1900, 2200, 2500, 2700, 3200, can also provide a series-resonant electrical topology.

There is minimal electric field between first conductor sublayers 210 within a given conductor layer 2108, during operation of resonant coil 2100. Consequentially, sublayer dielectric layers 214 can be formed of low-cost, industry standard dielectric materials having relatively high-loss, such as FR4 or polyimide, without negatively impacting performance. Additionally, thickness of sublayer dielectric layers 214 does not materially affect electrical properties of resonant coil 2100, which further promotes flexibility in selecting sublayer dielectric layer 214 material.

There is significant electric field between conductor layers 2108 during operation of resonant coil 2100. Consequently, separation dielectric layers 606 must be formed of a relatively low-loss dielectric material, such as PTFE, PFA, ETFE, FEP, polypropylene, polyethylene, polystyrene, glass, or ceramic, to achieve high performance of resonant coil 2100. Capacitance values can be adjusted during the design of resonant coil 2100 by varying size and/or separation of conductor layers 2108. Although resonant coil 2100 is shown as including only three conductor layers 2108 to promote illustrative clarity, it is anticipated that resonant coil 2100 will typically have additional conductor layers 2108. In such embodiments, conductor layers 2108 are electrically coupled to achieve a series resonant topology.

Figure 22:
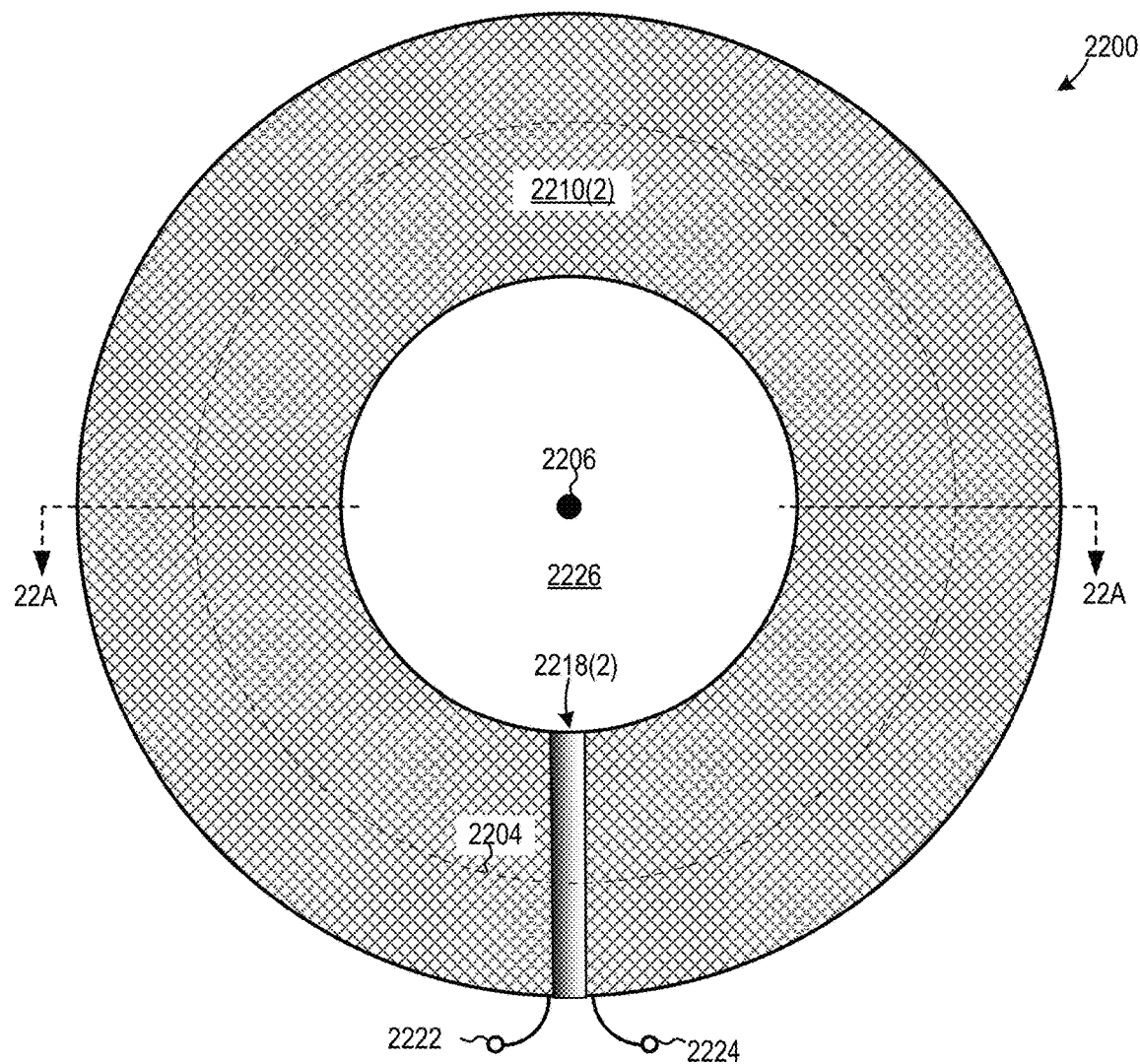
FIG. 22 is a top plan view of a resonant coil including a plurality of concentric tubular conductor layers, according to an embodiment.
Figure 23:
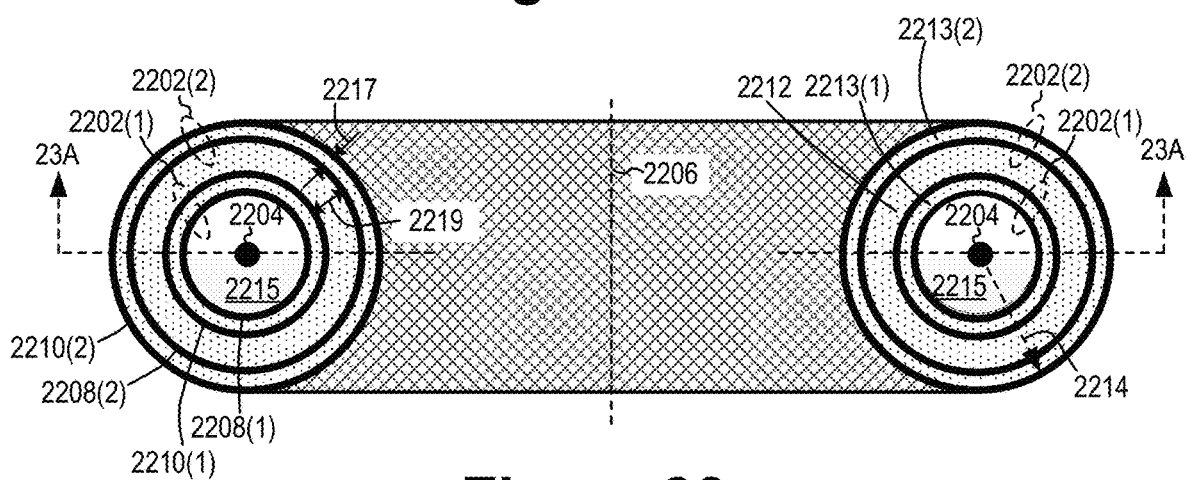
FIG. 23 is a cross-sectional view of the FIG. 22 resonant coil taken along line 22A-22A of FIG. 22.
Figure 24:
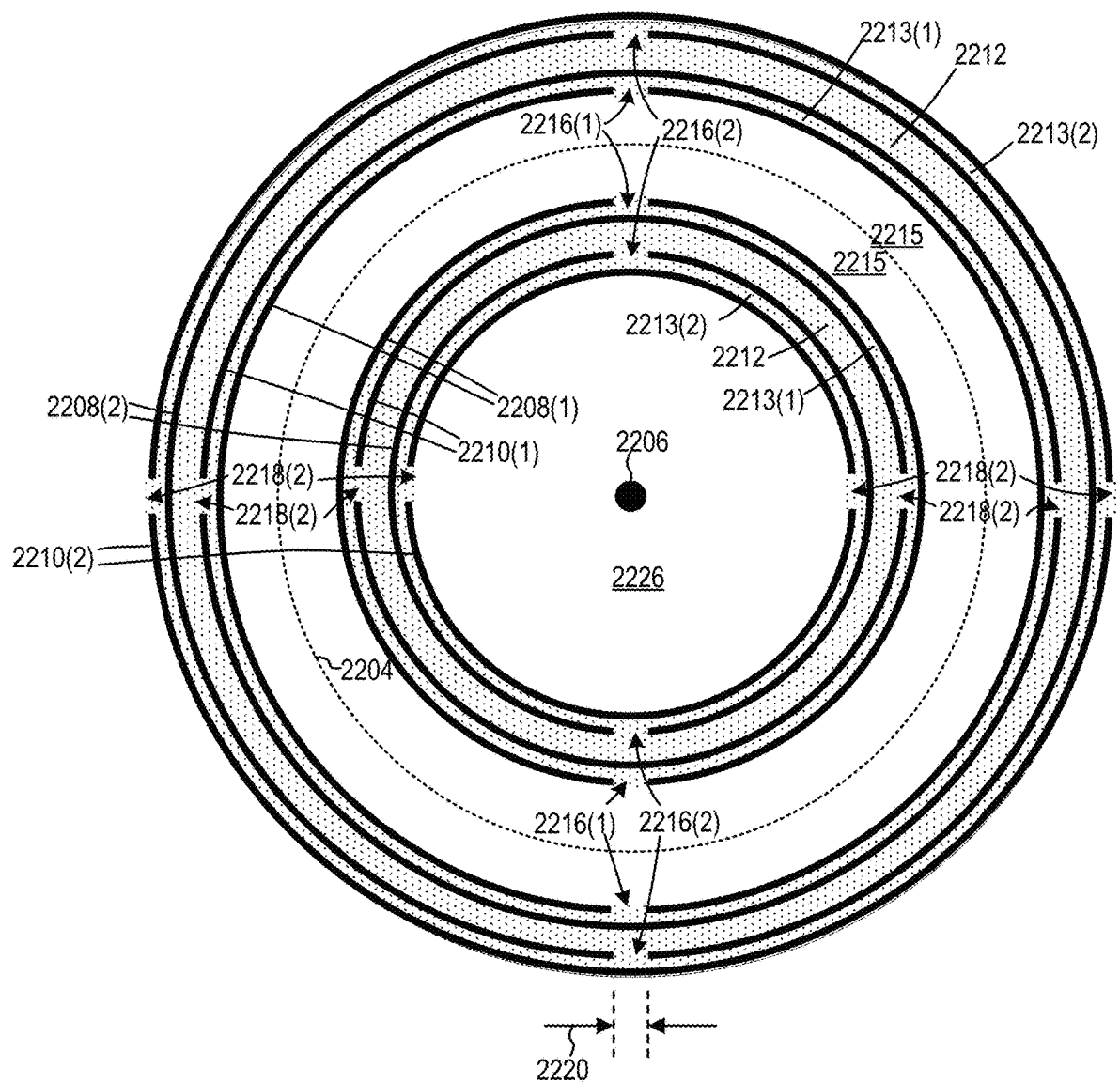
FIG. 24 is a cross-sectional view of the FIG. 22 resonant coil taken along line 23A-23A of FIG. 23.

FIG. 22 is a top plan view of a resonant coil 2200 with integrated capacitors including a plurality of concentric tubular conductor layers. FIG. 23 is a cross-sectional view of resonant coil 2200 taken along line 22A-22A of FIG. 22, and FIG. 24 is a cross-sectional view of resonant coil 2200 taken along line 23A-23A of FIG. 23. Resonant coil 2200 includes a plurality of tubular conductor layers 2202 concentrically stacked around a common axis 2204. Although resonant coil 2200 is illustrated as including two tubular conductor layers 2202, resonant coil 2200 could include additional tubular conductor layers 2202 without departing from the scope hereof. Common axis 2204 forms a loop around a center axis 2206 of resonant coil 2200.

Each tubular conductor layer 2202 includes a first tubular conductor sublayer 2208 and a second tubular conductor sublayer 2210 concentrically stacked around common axis 2204. In some embodiments, first and second tubular conductor sublayers 2208, 2210 are formed of conductive foil or conductive film. The conductive foil or film typically has a thickness smaller than, or close to, its skin depth at an intended operating frequency, thereby promoting efficient use of foil conductor sublayers 2208, 2210 and corresponding low power loss. In some embodiments, thickness of the foil or conductive film is inversely proportional to the square root of the number of tubular conductor layers 2202, such that thickness decreases as the number of tubular conductor layers increases. A separation dielectric layer 2212 separates each pair of adjacent tubular conductor layers 2202 in a radial 2214 direction extending from common axis 2204. Consequentially, tubular conductor layers 2202 and separation dielectric layers 2212 are concentrically stacked in an alternating manner. A sublayer dielectric layer 2213 separates adjacent first and second tubular conductor sublayers 2208, 2210 in the radial 2214 direction within each tubular conductor layer. In some embodiments, a radial separation distance 2217 between adjacent first and second conductor sublayers 2208, 2210 is significantly smaller than a radial separation distance 2219 between adjacent conductor layers 2202 to minimize electrostatic coupling of conductor layers. Separation dielectric layers 2212 and sublayer dielectric layers 2213 each include, for example, plastic, paper, glass, oil, adhesive, ceramic material, and/or air. Separation dielectric layers 2212 and sublayer dielectric layers 2213 may be formed of the same material to simplify construction and to promote low cost. Alternately, separation dielectric layers 2212 and sublayer dielectric layers 2213 may be formed of different materials. In some embodiments, an area 2215 in the center of tubular conductor layers 2202 includes a substrate, such as a dielectric substrate, while in other embodiments, area 2215 is filled with air or another gas.

First and second tubular conductor sublayers 2208, 2210 of each tubular conductor layer 2202 overlap with each other along part of common axis 2204. Such overlap of tubular conductive sublayers 2208, 2210 within each tubular conductor layer 2202 forms a capacitor integrated within the tubular conductor layer. Each first tubular conductor sublayer 2208 forms a first and second discontinuity 2216, and each second tubular conductor sublayer 2210 forms a first and second discontinuity 2218, in the toroidal direction, so that conductor sublayers 2208, 2210 do not completely encircle center axis 2206, as illustrated in FIG. 24. Although not required, first discontinuities 2216 of first tubular conductor sublayers 2208 are typically angularly displaced from second discontinuities 2218 of second tubular conductor sublayers 2210 around center axis 2206. For example, first discontinuities 2216 are angularly displaced from second discontinuities 2218 by 90 degrees in some embodiments, such as illustrated in FIG. 24. The discontinuities within each sublayer are shown as evenly dispersed. In this case with two discontinuities, the discontinuities are angularly offset from each other by 180 degrees. The discontinuities within each sublayer may also be distributed in a different angular relationship.

The capacitance value of the respective capacitor of each tubular conductor layer 2202 is proportional to the area of overlap of the layer's constituent first and second tubular conductor sublayers 2208, 2210. Accordingly, capacitance values can be adjusted during the design of resonant coil 2200 by varying the respective widths 2220 of first and second discontinuities in the toroidal direction. (See FIG. 24). For instance, if smaller capacitance values are desired, widths 2220 of first and second discontinuities 2216, 2218 can be made larger. Although it is anticipated that each first and second discontinuity 2216, 2218 will have the same width 2220, it is possible for discontinuity width to vary among tubular conductor sublayer instances without departing from the scope hereof. The capacitance value of the respective capacitor of each tubular conductor layer 2202 is also inversely proportional to radial separation 2217 of the layer's constituent first and second tubular conductor sublayers 2208, 2210, and capacitance can therefore be adjusted during resonant coil 2200 design by varying the radial separation of the tubular conductor sublayers. Furthermore, resonant coil 2200 could modified so that each conductor sublayer 2208 and 2210 forms additional discontinuities.

In the embodiment of FIGS. 22-24, common axis 2204 forms a circle around center axis 2206 such that common axis 2204 forms a closed loop, as illustrated in FIGS. 22 and 24, and each tubular conductor sublayer 2208, 2210 has a circular cross-section perpendicular to common axis 2204, such that resonant coil 2200 has a toroidal shape. However, the shape of the loop formed by common axis 2204 and/or the cross-sectional shape of tubular conductor sublayers 2208, 2210 could be varied without departing from the scope hereof. For example, in one alternate embodiment, common axis 2204 forms a non-planar closed loop.

The fact that first and second tubular conductor sublayers 2208, 2210 do not completely encircle center axis 2206 causes current to flow through resonant coil 2200 in the direction of common axis 2204, or in other words, causes current to flow in the toroidal direction. Resonant coil 2200 optionally includes electrical terminals 2222, 2224 electrically coupled to opposing ends of second tubular conductor sublayer 2210(2), as illustrated in FIG. 22, to provide electrical access to resonant coil 2200. A magnetic field generated by current flowing through second tubular conductor sublayer 2210(2) induces current through the remaining first and second tubular conductor sublayers 2208, 2210, and it therefore may be unnecessary to couple the other tubular conductor sublayers to electrical terminals. However, alternate or additional tubular conductor sublayers could be electrically coupled to electrical terminals without departing from the scope hereof.

One possible application of resonant coil 2200 is to form a resonant inductive-capacitive device, such as a resonant inductor, for use in electrical circuits. For example, the inductance and capacitance of resonant coil 2200 could be tuned to form a resonant device of a desired frequency. A magnetic core (not shown) is optionally disposed partially or completely around resonant coil 2200 to achieve a desired reluctance and/or to help contain the magnetic field, in these device applications. For instance, in some embodiments, a cylindrical magnetic core is disposed in center 2226 of resonant coil 2200.

Another possible application of resonant coil 2200 is to form a resonant induction coil for generating an external magnetic field, such as for induction heating, magnetic hyperthermia, or wireless power transfer. In these applications, an AC power source (not shown), for example, is electrically coupled to electrical terminals 2222, 2224 to power resonant coil 2200. The toroidal shape of resonant coil 2200 causes its magnetic field to be concentrated in center 2226 of the multilayer conductor. Accordingly, it is anticipated that the magnetic field would be accessed in center 2226 of resonant coil 2200 in resonant induction coil applications. For example, in applications where resonant coil 2200 forms a resonant induction coil for induction heating, it is expected that the workpiece would be disposed in center 2226 to realize maximum magnetic field strength at the workpiece location. The magnetic field also extends along center axis 2206, decreasing in magnitude with distance above resonant coil 2200. In some resonant induction coil applications, the magnetic field in the region above the multilayer conductor is used, for example, for wireless power transfer or for magnetic hyperthermia.

Figure 25:
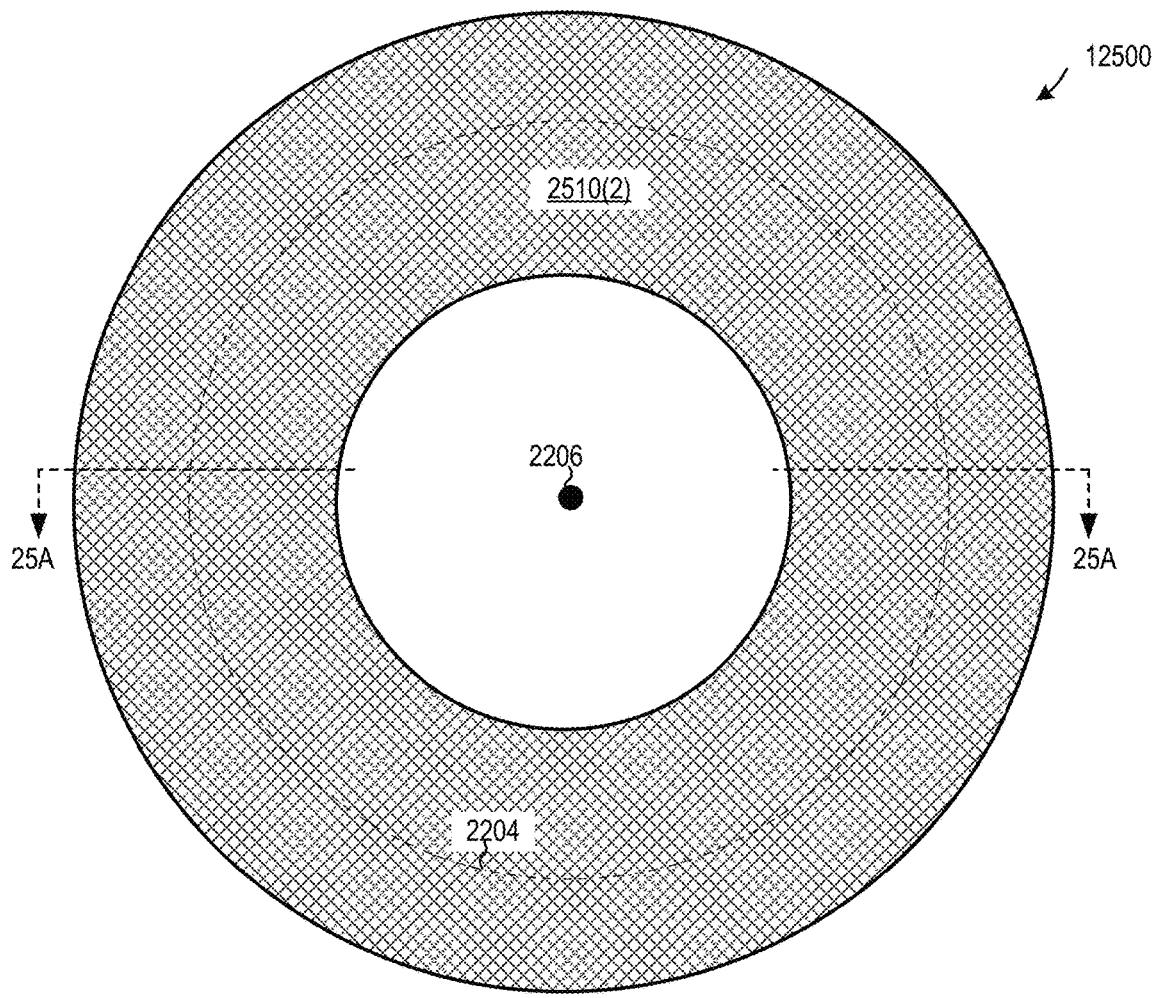
FIG. 25 is a top plan view of another resonant coil with integrated capacitors including a plurality of concentric tubular conductor layers, according to an embodiment.
Figure 26:
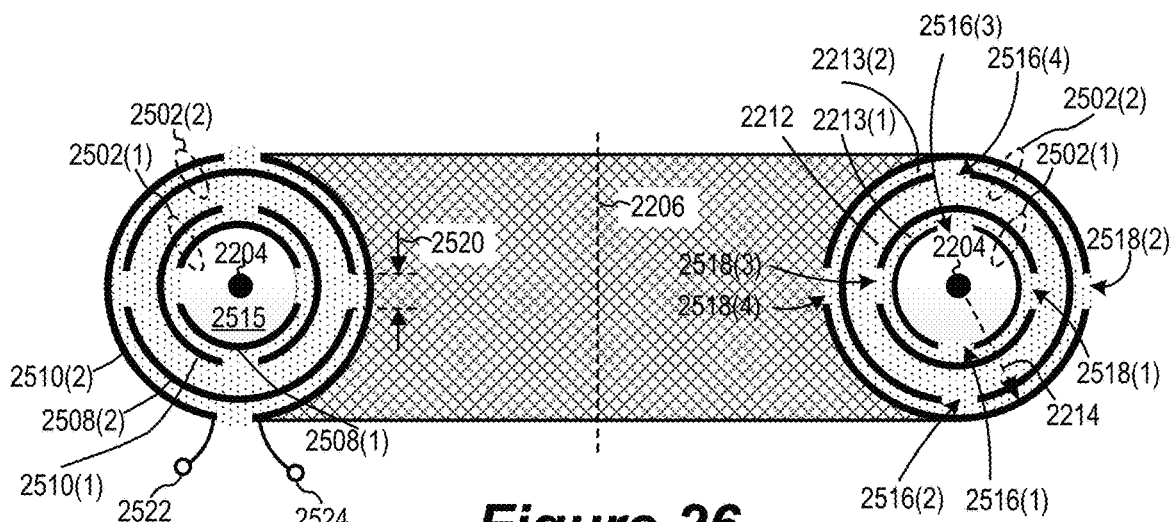
FIG. 26 is a cross-sectional view of the FIG. 25 resonant coil taken along line 25A-25A of FIG. 25

FIG. 25 is a top plan view of a resonant coil 2500 with integrated capacitors including a plurality of concentric tubular conductor layers, and FIG. 26 is a cross-sectional view of resonant coil 2500 taken along line 25A-25A of FIG. 25. Resonant coil 2500 is similar to resonant coil 2200 of FIGS. 22-24, but with tubular conductor layers 2202 replaced with tubular conductor layers 2502. As discussed below, tubular conductor sublayer discontinuities of resonant coil 2500 are formed along poloidal axes such that each tubular conductor sublayer does not completely encircle common axis 2204, so that the current flow and magnetic field paths of multilayer conductor 2500 differ from those of resonant coil 2200.

Each tubular conductor layer 2502 includes a first tubular conductor sublayer 2508 and a second tubular conductor sublayer 2510 concentrically stacked around common axis 2204. In some embodiments, first and second tubular conductor sublayers 2508, 2510 are formed of conductive foil or conductive film. The conductive foil or film typically has a thickness smaller than, or close to, its skin depth at an intended operating frequency, thereby promoting efficient use of foil conductor sublayers 2508, 2510 and corresponding low power loss. In some embodiments, thickness of the foil or conductive film is inversely proportional to the square root of the number of tubular conductor layers 2502, such that thickness decreases as the number of tubular conductor layers increases. A separation dielectric layer 2212 separates each pair of adjacent tubular conductor layers 2502, and a sublayer dielectric layer 2213 separates first and second tubular conductor sublayers 2508, 2510 within each tubular conductor layer. First and second tubular conductor sublayers 2508, 2510 of each tubular conductor layer 2502 overlap with each other in radial direction 2214 extending from common axis 2204, along part of the length of common axis 2204. Such overlap of tubular conductor sublayers 2508, 2510 within each tubular conductor layer 2502 forms a capacitor integrated within the tubular conductor layer. Each first tubular conductor sublayer 2508 forms a set of notches or discontinuities 2516, and each second tubular conductor sublayer 2510 forms a second set of notches or discontinuities 2518, so that each tubular conductor sublayer 2508, 2510 does not completely encircle common axis 2204, as illustrated in FIG. 26. Although not required, first discontinuities 2516 are typically angularly displaced from second discontinuities 2518 around common axis 2204. For example, first discontinuities 2516 are angularly displaced from second discontinuities 2518 by 90 degrees in some embodiments, such as illustrated in FIG. 26. The discontinuities in each sublayer may not be equally spaced as show in their 180 degrees displacement.

Capacitance values can be adjusted during the design of resonant coil 2500 by varying the respective widths 2520 of first and second discontinuities in the poloidal direction, in a manner similar to that discussed above with respect to resonant coil 2200. Additionally, capacitance can be adjusted during multilayer conductor 2500's design by varying the radial 2214 separation of the tubular conductor sublayers, similar to as discussed above with respect to resonant coil 2200. Furthermore, capacitance can be adjusted during resonant coil 2500's design by increasing the number of discontinuities formed by conductor sublayers 2508, 2510.

The fact that first and second sets of discontinuities 2516, 2518 do not completely encircle common axis 2204 causes current to flow through resonant coil 2200 around common axis 2204, or in other words, causes current to flow in the poloidal direction. The magnetic field, in turn, is directed along common axis 2204, or in other words, in the toroidal direction, within a center portion 2515 of concentric tubular conductor layers 2502. Resonant coil 2200 optionally includes electrical terminals 2522, 2524 electrically coupled to opposing ends of second tubular conductor sublayer 2510(2), as illustrated in FIG. 26, to provide electrical access to resonant coil 2500. A magnetic field generated by current flowing through second tubular conductor sublayer 2510(2) induces current through the remaining first and second tubular conductor sublayers 2508, 2510, and it therefore may be unnecessary to couple the other tubular conductor sublayers to electrical terminals. However, alternate or additional tubular conductor sublayers could be electrically coupled to electrical terminals without departing from the scope hereof.

One possible application of resonant coil 2500 is to form a magnetic device with integrated capacitance, such as a resonant inductor, for use in electrical circuits. For example, the inductance and capacitance of multilayer conductor 2500 could be tuned to form a resonant circuit of a desired frequency. A magnetic core (not shown) is optionally disposed within center 2515 of tubular conductor layers 2502 to achieve a desired reluctance.

Figure 27:
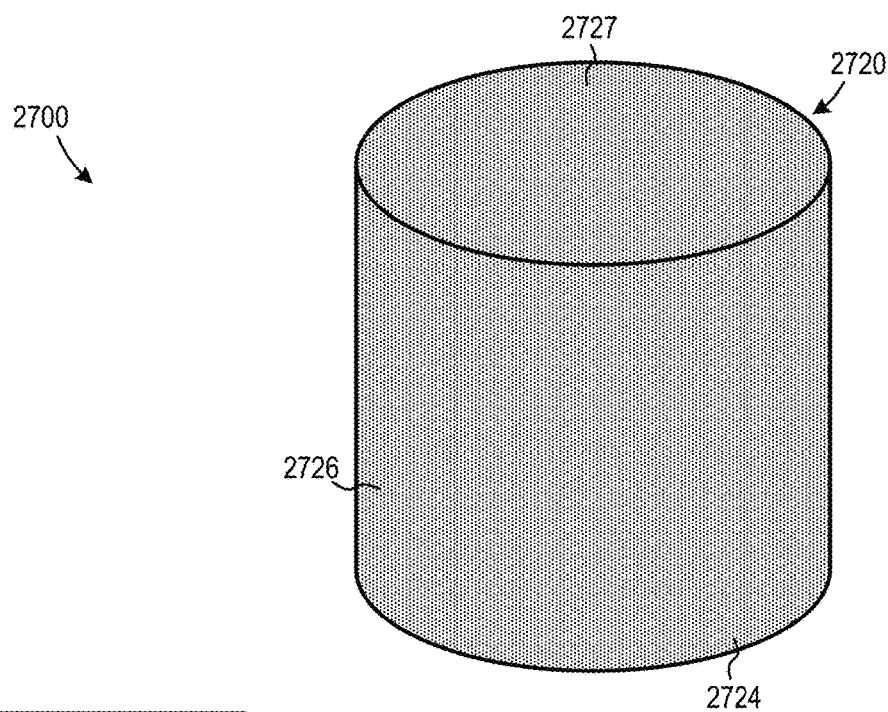
FIG. 27 is a perspective view of a device including yet another resonant coil with integrated capacitors, according to an embodiment.
Figure 28:
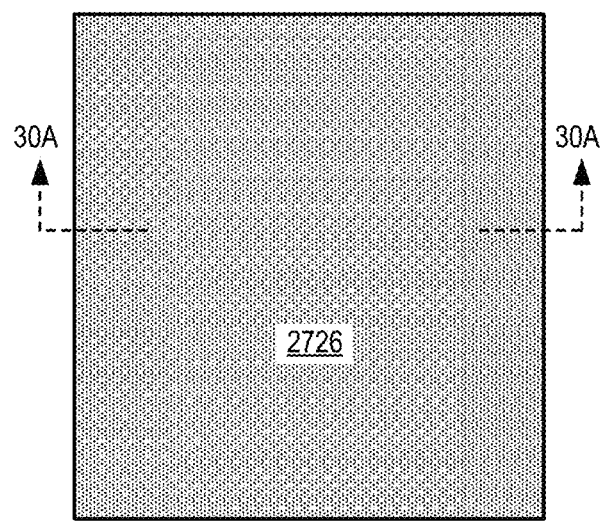
FIG. 28 is a side elevational view of the FIG. 27 device.
Figure 29:
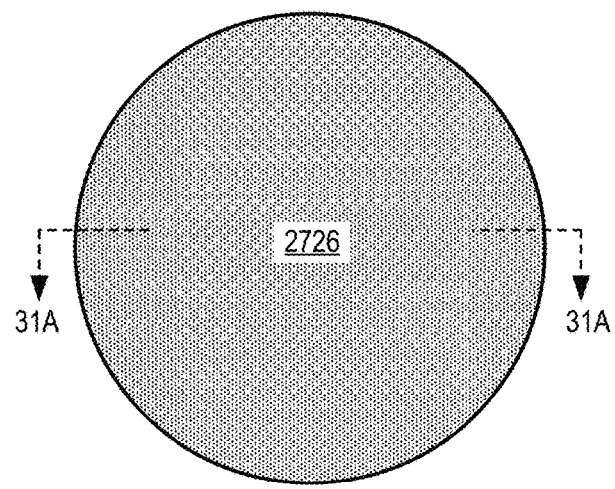
FIG. 29 is a top plan view of the FIG. 27 device.
Figure 30:
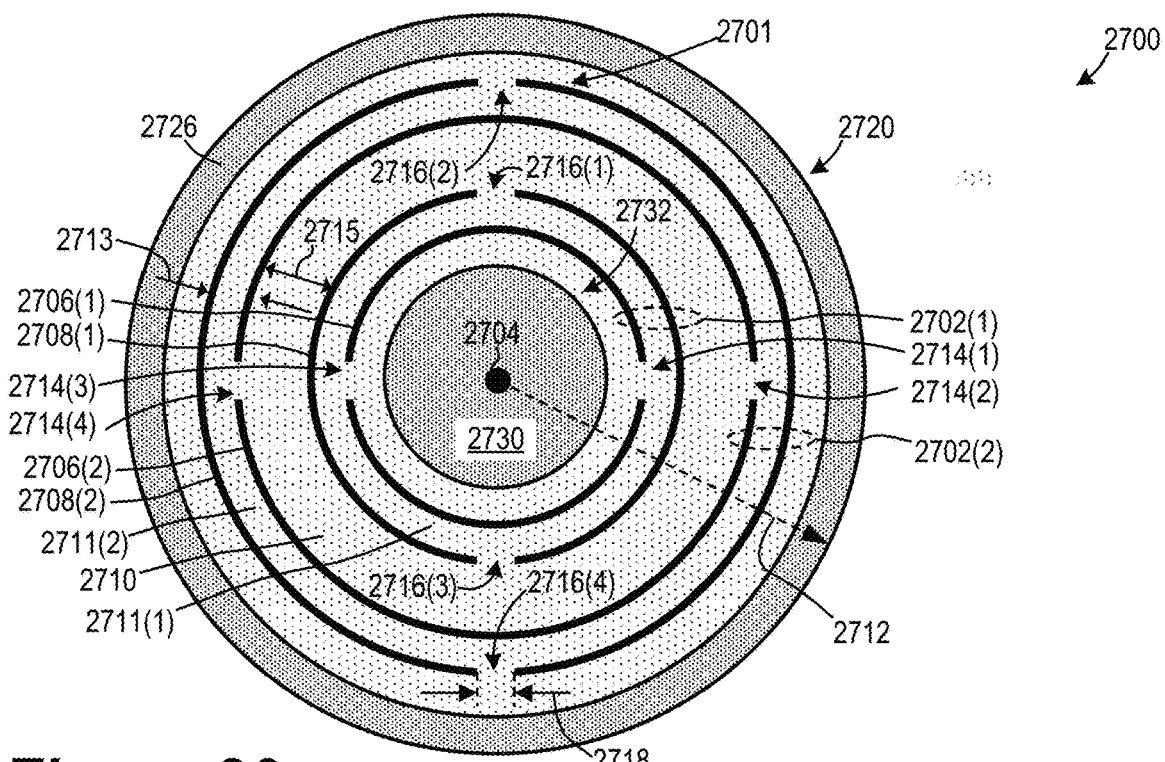
FIG. 30 is a cross-sectional view of the FIG. 27 device taken along line 30A-30A of FIG. 28.
Figure 31:
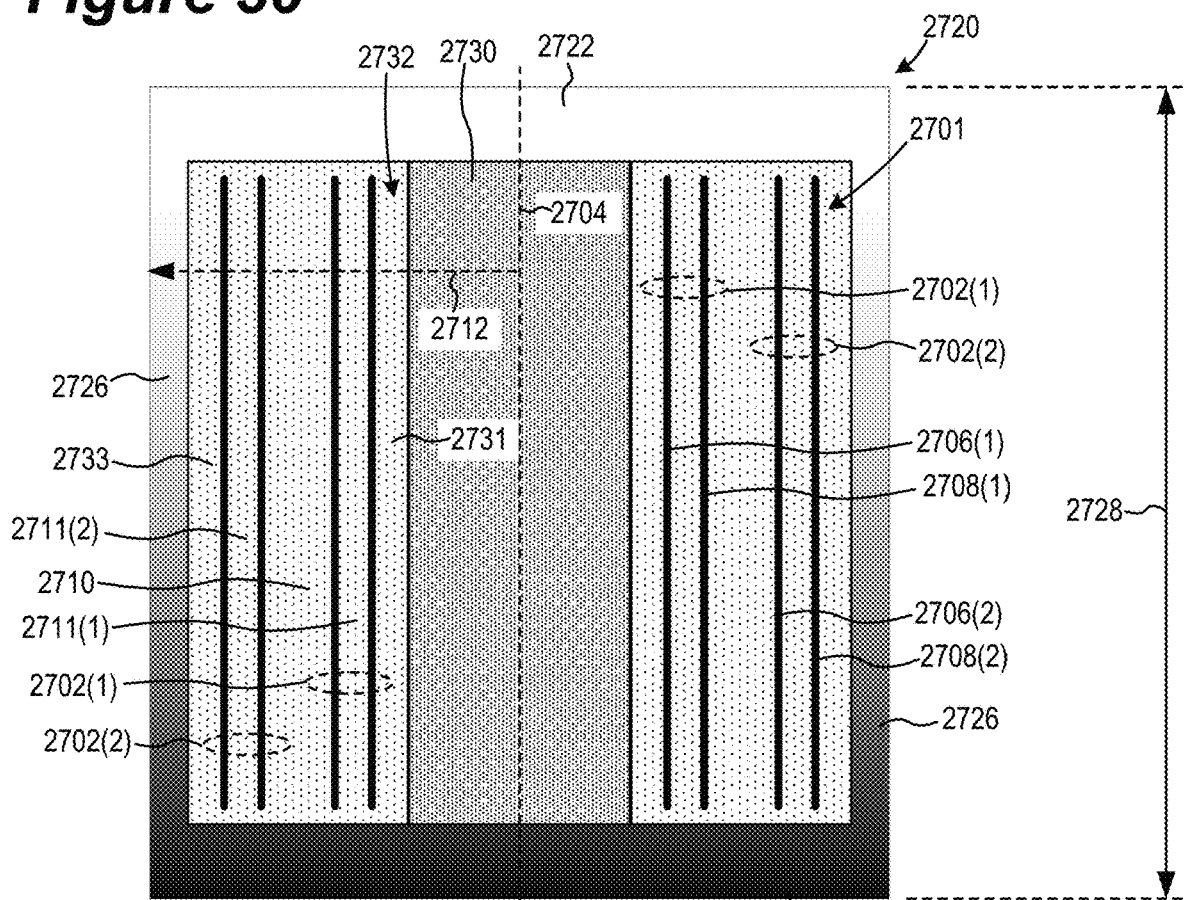
FIG. 31 is a cross-sectional view of the FIG. 27 device taken along line 29A-29A of FIG. 29.

FIGS. 27-31 illustrate a device 2700 including a resonant coil 2701, where resonant coil 2701 is another embodiment of a resonant coil with integrated capacitors and including a plurality of concentric tubular conductor layers. FIG. 27 is a perspective view of device 2700, FIG. 28 is a side elevational view of device 2700, and FIG. 29 is a top plan view of device 2700. FIG. 30 is a cross-sectional view of device 2700 taken along line 28A-28A of FIG. 28, and FIG. 31 is a cross-sectional view of the device along line 29A-29A of FIG. 29.

Resonant coil 2701 includes a plurality of tubular conductor layers 2702 concentrically stacked around a common or center axis 2704, as illustrated in FIGS. 30 and 21. Although resonant coil 2701 is illustrated as including two tubular conductor layers 2702, resonant coil 2701 could include additional tubular conductor layers 2702 without departing from the scope hereof. Each tubular conductor layer 2702 includes a first tubular conductor sublayer 2706 and a second tubular conductor sublayer 2708 concentrically stacked around center axis 2704. In some embodiments, first and second tubular conductor sublayers 2706, 2708 are formed of conductive foil or conductive film. The conductive foil or film typically has a thickness smaller than, or close to, its skin depth at an intended operating frequency, thereby promoting efficient use of foil conductor sublayers 2706, 2708 and corresponding low power loss. In some embodiments, thickness of the foil or conductive film is inversely proportional to the square root of the number of tubular conductor layers 2702, such that thickness decreases as the number of tubular conductor layers increases.

A separation dielectric layer 2710 separates each pair of adjacent tubular conductor layers 2702. Consequentially, tubular conductor layers 2702 and separation dielectric layers 2710 are concentrically stacked around center axis 2704. A sublayer dielectric layer 2711 separates adjacent first and second tubular conductor sublayers 2706, 2708 within each tubular conductor layer. In some embodiments, a radial 2712 separation distance 2713 between adjacent first and second conductor sublayers 2706, 2708 is significantly smaller than a radial 2712 separation distance 2715 between adjacent conductor layers 2702 to minimize electrostatic coupling of conductor layers. Separation dielectric layers 2710 and sublayer dielectric layers 2711 each include, for example, plastic, paper, glass, oil, adhesive, ceramic material, and/or air. Separation dielectric layers 2710 and sublayer dielectric layers 2711 may be formed of the same material to simplify construction and to promote low cost. Alternately, separation dielectric layers 2710 and sublayer dielectric layers 2711 may be formed of different materials.

First and second tubular conductor sublayers 2706, 2708 of each tubular conductor layer 2702 at least partially overlap with each other. Such overlap of tubular conductive sublayers 2706, 2708 within each tubular conductor layer 2702 forms a capacitor integrated within the tubular conductor layer. Each first tubular conductor sublayer 2706 forms a set of notches or discontinuities 2714, such that the first tubular conductor sublayer does not completely encircle center axis 2704, as illustrated in FIG. 30. Similarly, each second tubular conductor sublayer 2708 forms a second set of notches or discontinuities 2716, such that the second tubular conductor sublayer does not completely encircle center axis 2704, as also illustrated in FIG. 30. Although not required, first discontinuities 2714 are typically angularly displaced from second discontinuities 2716 around center axis 2704. For example, first discontinuities 2714 are angularly displaced from second discontinuities 2716 by 180 degrees in some embodiments, such as illustrated in FIG. 30. Although each discontinuity 2714, 2716 is illustrated as having a rectangular shape, the shape of the discontinuities could vary without departing from the scope hereof.

Capacitance values can be adjusted during the design of resonant coil 2701 by varying the respective widths 2718 of first and second discontinuities 2714, 2716, in a manner similar to that discussed above with respect to resonant coil 900. Additionally, capacitance can be adjusted during resonant coil 2701's design by varying radial separation distance 2713 of the tubular conductor sublayers, similar to as discussed above with respect to resonant coil 900. Furthermore, capacitance can be adjusted during the design of resonant coil 2701 by increasing number of discontinuities formed by conductor sublayers 2706 and 2708.

Although not required, device 2700 typically includes a magnetic core 2720 enclosing tubular conductor layers 2702 to help achieve desired reluctance, to help contain a magnetic field generated by current flowing through tubular conductor layers 2702, and/or to influence the shape of the magnetic field lines in the region of tubular conductor layers 2702 to be substantially parallel to the layers. For example, in some embodiments, magnetic core 2720 has a hollow cylindrical shape and is centered with respect to center axis 2704, as illustrated in FIGS. 30 and 31. In these embodiments, magnetic core 2720 includes a first end magnetic element 2722, a second end magnetic element 2724, and an outer ring 2726. First end magnetic element 2722 opposes second end magnetic element 2724 in a lengthwise 2728 direction parallel to center axis 2704. Outer ring 2726 is centered with respect to center axis 2704, and outer ring 2726 also joins first and second end magnetic elements 2722, 2724 in the lengthwise 2728 direction. Accordingly, resonant coil 2701 is disposed between first and second end magnetic elements 2722, 2724 and within outer ring 2726.

A magnetic center post 2730 is disposed in a center 2732 of tubular conductor layers 2702 along center axis 2704. Magnetic center post 2730 at least partially joins first and second end magnetic elements 2722, 2724 in the lengthwise 2728 direction. Magnetic flux generated by current flowing through tubular conductor layers 2702 flows in a loop through magnetic center post 2730, first end magnetic element 2722, outer ring 2726, and second end magnetic element 2724. Although not required, additional dielectric material 2731, 2733 typically separates tubular conductor layers 2702 from magnetic center post 2730 and outer ring 2726, respectively. Although FIG. 31 delineates magnetic center post 2730 from first end magnetic element 2722 and second end magnetic element 2724 to help the viewer distinguish the magnetic center post from the end magnetic elements, the magnetic center post could be joined with one or more of the end magnetic elements without departing from the scope hereof. Additionally, although outer ring 2726 and end magnetic elements 2722, 2724 are illustrated as being part of a single-piece magnetic core, magnetic core 2720 could be formed from two or more magnetic pieces that are joined together.

Magnetic center post 2730 could have the same composition as magnetic core 2720 to simplify construction. Alternately, magnetic center post 2730 could have a different composition from magnetic core 2720, such as to help achieve a desired reluctance. For example, in some embodiments, magnetic core 2720 is formed of a high permeability ferrite material, and magnetic center post 2730 is formed of a lower permeability material including magnetic materials disposed in a non-magnetic binder, such that the magnetic center post has a distributed non-magnetic "gap." In these embodiments, a desired reluctance is achieved, for example, by adjusting the ratio of magnetic material and non-magnetic binder forming magnetic center post 2730.

Magnetic center post 2730 could also form a discrete gap (not shown) filled with non-magnetic material, or with material having a lower magnetic permeability than the remainder of the magnetic center post, to help achieve a desired reluctance. However, a single gap may cause magnetic field lines, which generally flow in the lengthwise 2728 direction through magnetic center post 2730, to curve in the vicinity of the gap, such that the magnetic field lines induce eddy current losses in tubular conductor layers 2702. Such eddy-current losses can be reduced by forming a quasi-distributed gap from multiple small gaps, instead of a single large gap, in magnetic center post 2730.

In another alternate embodiment of device 2700, first and second end magnetic elements 2722, 2724 are each formed of a high permeability magnetic material, and outer ring 2726 and magnetic center post 2730 are each formed of a low permeability magnetic material. The low permeability magnetic material in this embodiment includes, for example, a low permeability homogenous magnetic material, a low permeability composite magnetic material, a high permeability magnetic material including multiple gaps forming a quasi-distributed gap, or air. Magnetic center post 2730 could even be completely omitted.

Device 2700 optionally includes electrical terminals (not shown) electrically coupled to opposing ends of one or more tubular conductor sublayers 2706, 2708, to provide electrical access to the resonant coil 2701. A magnetic field generated by current flowing through one tubular conductor sublayer 2706 or 2708 induces current through the remaining first and second tubular conductor sublayers 2706, 2708. Therefore, it may be unnecessary to couple all other tubular conductor sublayers to electrical terminals.

One possible application of device 2700 is to form a resonant inductive-capacitive device, such as a resonant inductor, for use in electrical circuits. Another possible application of device 2700 is to form a resonant induction coil for generating a magnetic field, such as for induction heating, magnetic hyperthermia, or wireless power transfer. In these applications, an AC power source (not shown), for example, is electrically coupled to opposing ends of at least one conductor sublayer to power resonant coil 2701. While not required, it is anticipated that the magnetic field would be accessed in center 2732 of device 2700 in induction coil applications. For example, in applications where device 2700 forms a resonant induction coil for induction heating, it is expected that the workpiece would be disposed in center 2732 to realize maximum magnetic field strength. In such embodiments, magnetic center post 2730 is omitted to enable placement of the workpiece in center 2732, or the workpiece is disposed in a gap of magnetic center post 2730.

Although device 2700 is shown as being cylindrical, it could alternately have a different shape without departing from the scope hereof. For example, tubular conductor layers 2702 could alternately have an oval or rectangular cross-section, instead of a circular cross-section, as seen when viewed cross-sectionally along line 28A-28A of FIG. 28. Additionally, although magnetic center post 2730 is illustrated as having a cylindrical shape, it could also have a different shape without departing from the scope hereof.

Figure 32:
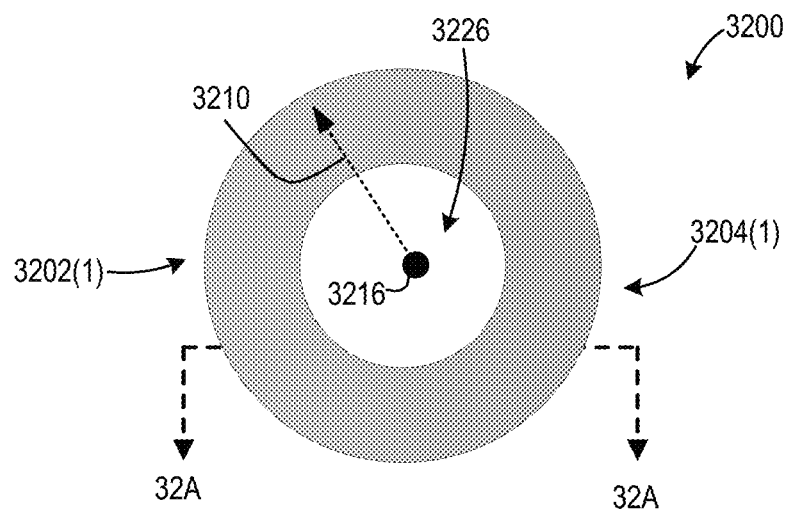
FIG. 32 shows a top plan view of a resonant coil including a stack of C-shaped foil conductors, according to an embodiment.
Figure 33:
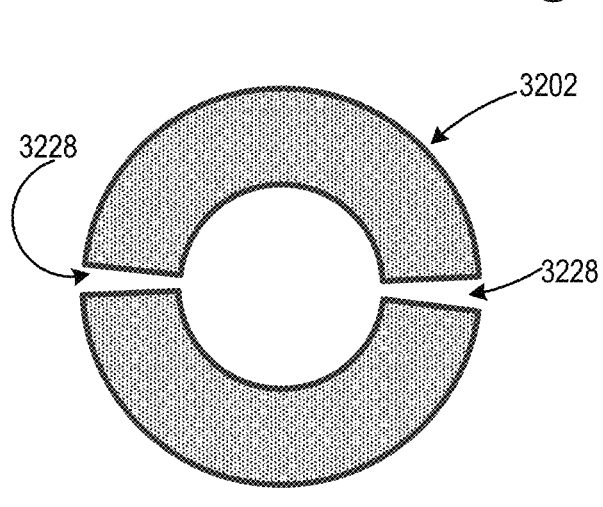
FIGS. 33 and 34 show top plan views of first and second foil conductor sublayers, respectively, of the FIG. 32 resonant coil.
Figure 34:
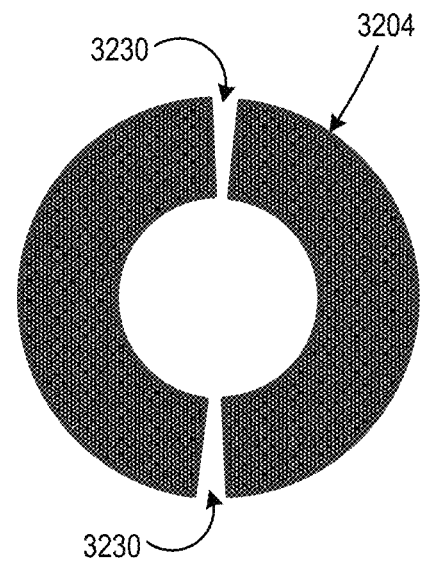
Figure 35:
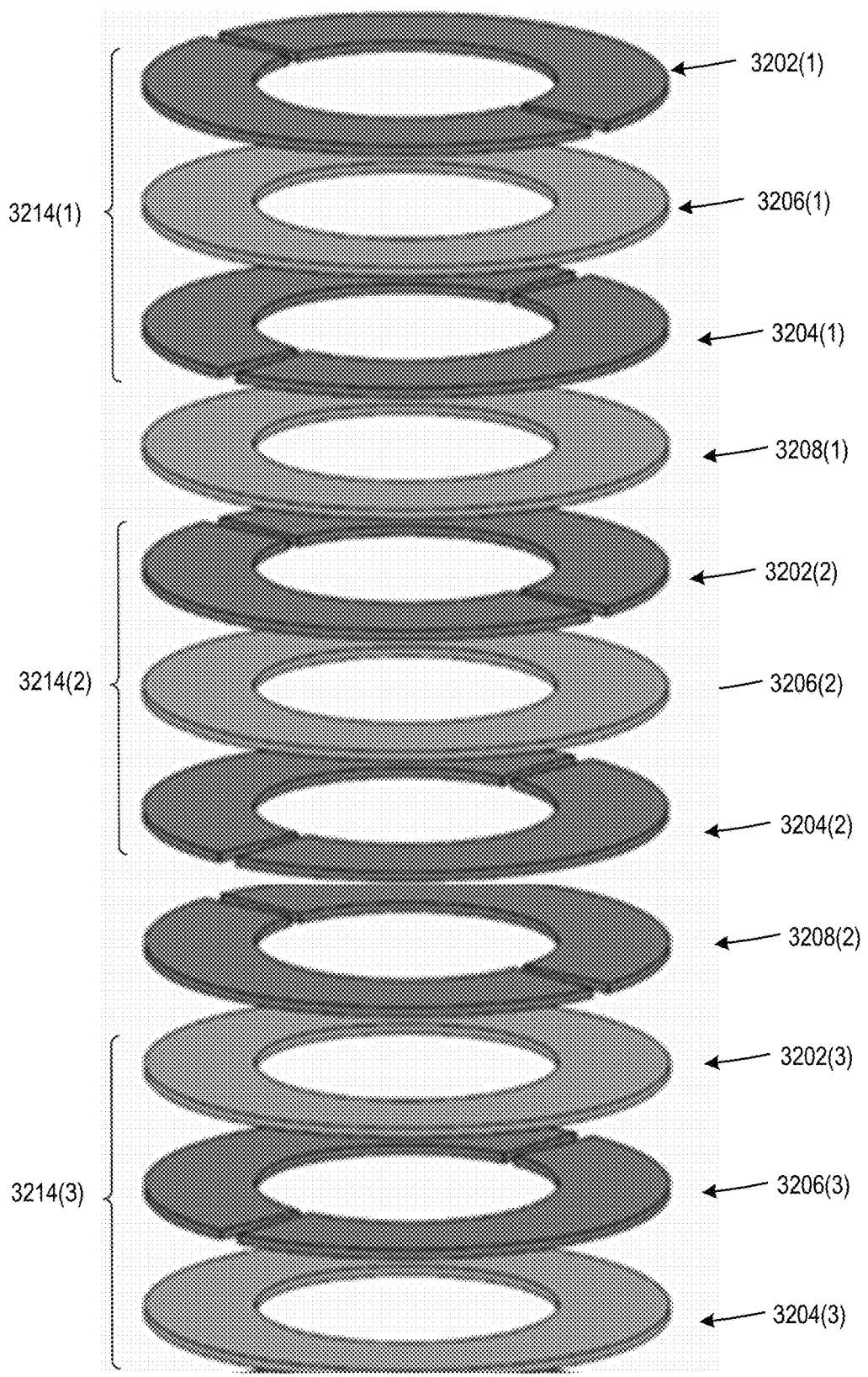
FIG. 35 shows an exploded perspective view of the FIG. 32 resonant coil.
Figure 36:
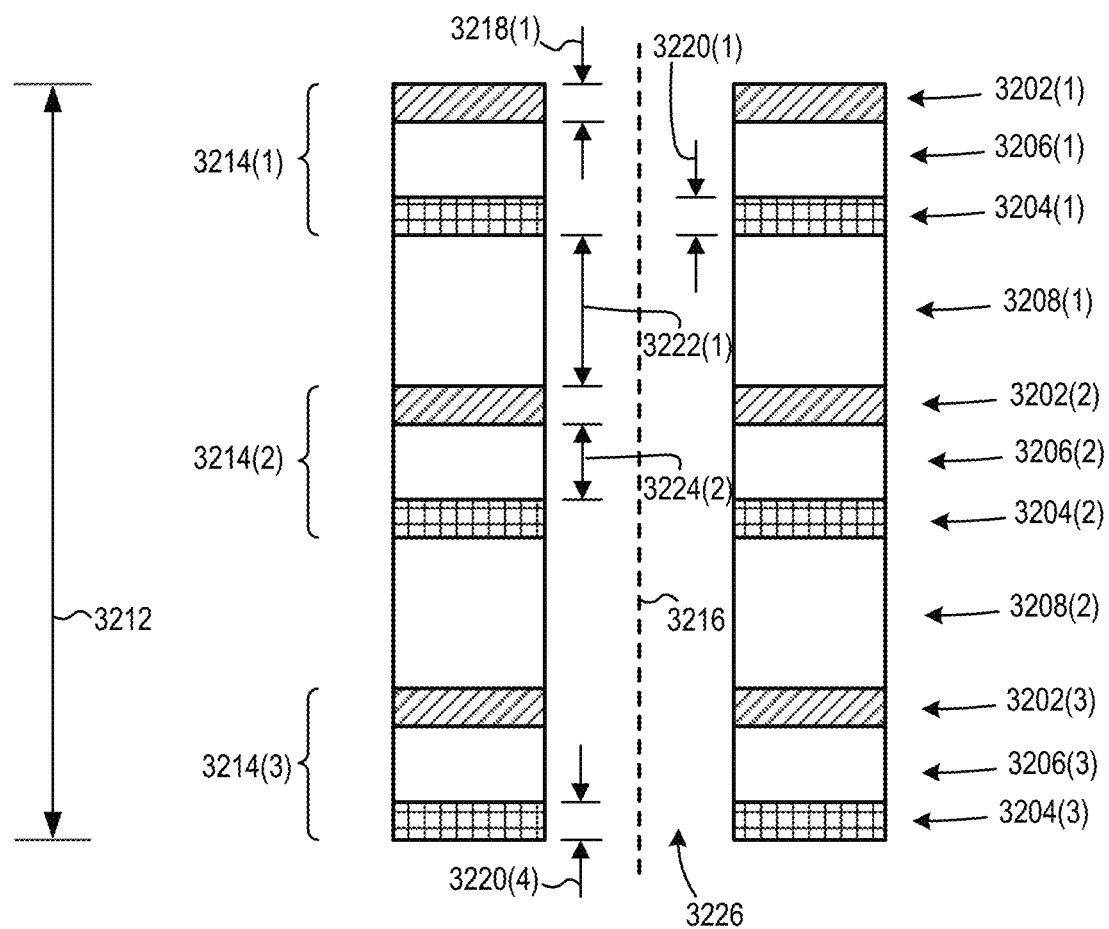
FIG. 36 shows a cross-sectional view of the FIG. 32 resonant coil.

Applicant has also developed resonant coil including a stack of double-C-shaped foil conductors. For example, FIG. 32 shows a top plan view of a resonant coil 3200. Resonant coil 3200 includes a stack of alternating electrically conductive first and second foil conductor sublayers 3202, 3204. FIG. 33 shows a top plan view of one first foil conductor sublayer 3202 instance, and FIG. 34 shows a top plan view of one second foil conductor sublayer 3204 instance. FIG. 35 shows an exploded perspective view of resonant coil 3200, and FIG. 36 shows a cross-sectional view of the resonant coil taken along line 32A-32A of FIG. 32. Resonant coil 3200 has a radius 3210 and a thickness 3212. It is anticipated that the dielectric layers 3206, 3208 will typically extend slightly, such as one to five millimeters, beyond the edges of foil conductor sublayers 3202, 3204 to minimize the likelihood of arcing between the edges of adjacent conductor sublayers.

First and second foil conductor sublayers 3202, 3204 have at least substantially similar notched toroidal shapes. However, second foil conductor sublayers 3204 are angularly displaced from first coil conductor sublayers by about 90 degrees around a center axis 3216, such that first foil conductor sublayers 3202 form a double C-shape, and second foil conductor sublayers 3204 form a rotated or double C-shape, when viewed cross-sectionally in the thickness 3212 direction. In some other embodiments, though, first foil conductor sublayers 3202 are angularly displaced from second foil conductor sublayers 3204 by an angle of other than 90 degrees. Dielectric layers 3206, 3208 may have a toroidal shape, as shown. However, since dielectric layers 3206, 3208 need only separate adjacent foil conductor sublayers, in some alternate embodiments, dielectric layers 3206, 3208 have a notched toroidal shape similar to that of foil conductor sublayers 3202, 3204, where the dielectric layer notches are generally aligned with the notch or discontinuity of an adjacent foil conductor sublayer 3202, 3204.

Resonant coil 3200 includes a plurality of unit cells or foil conductor layers 3214 stacked in the thickness 3212 direction. Each foil conductor layer 3214 includes a respective first foil conductor sublayer 3202, sublayer dielectric layer 3206, and second foil conductor sublayer 3204, stacked in the thickness 3212 direction. Adjacent foil conductor layers 3214 are separated in the thickness 3212 direction by a separation dielectric layer 3208. Accordingly, foil conductor layers 3214 and separation dielectric layers 3208 are stacked in an alternating manner in the thickness 3212 direction, and foil conductor sublayers 3202, 3204 are electrically isolated from each other by sublayer dielectric layers 3206, 3208. Foil conductor sublayers 3202, 3204 and dielectric layers 3206, 3208 are concentrically disposed around common center axis 3216 extending in the thickness 3212 direction. Each first foil conductor sublayer 3202 forms first discontinuities or notches 3228 such that the first foil conductor sublayer does not completely encircle center axis 3216, and each second foil conductor sublayer 3204 forms second discontinuities or notches 3230 such that the second foil conductor sublayer does not completely encircle center axis 3216. Foil conductor sublayers 3202 are angularly displaced from foil conductor sublayers 3204 by about 90 degrees around axis 3216. Thus, notches 3228, 3230 of first and second foil conductor sublayers 3202, 3204, respectively, are angularly displaced from each other by about 90 degrees, such that notches of immediately adjacent conductors in the thickness 3212 direction are angularly displaced from each other by 90 degrees. Although FIGS. 35 and 36 show resonant coil 3200 including three foil conductor layers 3214, resonant coil 3200 could be modified to have any number of foil conductor layers greater than one. Additionally, resonant coil 3200 could be modified to have one or more incomplete foil conductor layers 3214, such as an incomplete foil conductor layer including first foil conductor sublayer 3202 and sublayer dielectric layer 3206 instances, but no second foil conductor sublayer 3204 instance.

In some embodiments, foil conductor layer sublayers 3202, 3204 are formed of copper or aluminum, and dielectric layers 3206, 3208 are formed of a polymer material, such as polyimide. In certain embodiments, resonant coil 3200 is formed of laminated polyimide materials. Higher performance is potentially achieved, however, using an insulating material with a lower dielectric loss than polyimide. Some examples of possible insulating materials with low dielectric loss include polytetrafluoroethylene (PTFE), perfluoroalkoxy (PFA), ethylene tetrafluoroethylene (ETFE), fluorinated ethylene propylene (FEP), polypropylene, polyethylene, polystyrene, glass, and ceramic. PTFE and PFA may be well suited for extremely demanding applications because these materials have particularly low dielectric loss. Polypropylene may be well suited for cost sensitive applications since this material has both a low dielectric loss and relatively low cost.

Foil conductor sublayers 3202, 3204 have respective thicknesses 3218, 3220 (see FIG. 36) that are typically smaller than, or close to, their skin depths at an intended operating frequency, thereby promoting efficient use of foil conductor sublayers 3202, 3204 and corresponding low power loss. In embodiments including a large number of foil conductor layers 3214, it is anticipated that thicknesses 3218, 3220 will be much smaller than, or close to, skin depths at an intended operating frequency, to minimize losses. For example, in some embodiments, each thickness 3218, 3220 has an optimal value (t), which substantially minimizes losses, given by EQN. 1 below:

$$t_{opt} = \frac{3^{0.25}\delta}{\sqrt{M}}\left(\frac{K_1}{K}\right)^{0.25} \quad \text{EQN. 1}$$

In EQN. 1, M is a number of foil conductor layers, δ is skin depth, and $K_1$ and $K_2$ are respectively defined by EQNS. 2 and 3 below, where θ is angle of overlap, discussed below with respect to FIG. 35:

$$K_1 = 1 - \frac{\theta}{3\pi} \quad \text{EQN. 2}$$

$$K_2 = 1 + \frac{\theta}{\pi} \quad \text{EQN. 3}$$

Although each foil conductor sublayer 3202, 3204 instance is shown as having the same thickness 3218, 3220, thickness could vary among conductor sublayer instances, or even within a given conductor sublayer. In some embodiments, thicknesses 3222 of separation dielectric layers 3208 are greater than thicknesses 3224 of sublayer dielectric layers 3206, such as to minimize electrostatic coupling between foil conductor layers 3214. However, separation dielectric layers 3208 could alternately have the same thickness as sublayer dielectric layers 3206, such to allow use of a common dielectric material for both sublayer and separation dielectric layers and/or to achieve high effective capacitance values. For example, in certain embodiments, each foil conductor sublayer 3202, 3204 has a respective thickness 3218, 3220 of 18 microns, and each dielectric layer 3206, 3208 has a respective thickness 3224, 3222 of 20 microns. Furthermore, separation dielectric layers 3208 could even be thinner than sublayer dielectric layers 3206. Also, while it is anticipated that thickness 3224 will typically be the same for each sublayer dielectric layer instance, thickness 3224 could vary among sublayer layer 3206 instances without departing from the scope hereof. Similarly, separation dielectric layer 3208 thickness 3222 could either be the same or vary among layer 3208 instances. Only some instances of thicknesses 3218, 3220, 3222, 3224 are labeled in FIG. 33 to promote illustrative clarity.

Resonant coil 3202 forms a center aperture 3226, such that foil conductor sublayers 3202, 3204 are wound around the aperture and center axis 3216. It is anticipated that in many embodiments, a magnetic core (not shown) will extend through the aperture, to help direct the magnetic field produced by resonant coil 3200 to where it is needed and to help prevent stray magnetic flux. Use of a magnetic core potentially also helps shape the magnetic field in the region of resonant coil 3200 such that the magnetic flux above, below, and within resonant coil 3200 travels approximately parallel to foil conductor sublayers 3202, 3204, thereby promoting even conductor current distribution and low eddy current losses in the conductors. A magnetic core can also be used to help achieve a desired reluctance in applications requiring a particular reluctance value, such as in applications where the resonant coil forms an inductive-capacitive resonant device. One possible material for use in a magnetic core is manganese zinc power ferrite material, which has low losses at any frequency below about one megahertz, at flux densities up to about 200 millitesla. Use of a magnetic core is not required. Additionally, in some alternate embodiments, such as in embodiments intended for use without a core, dielectric layers 3206, 3208 are solid disc shaped as opposed to toroidal shaped, such that resonant coil 3200 does not form an aperture that extends along the entirety of thickness 3212.

Figure 37:
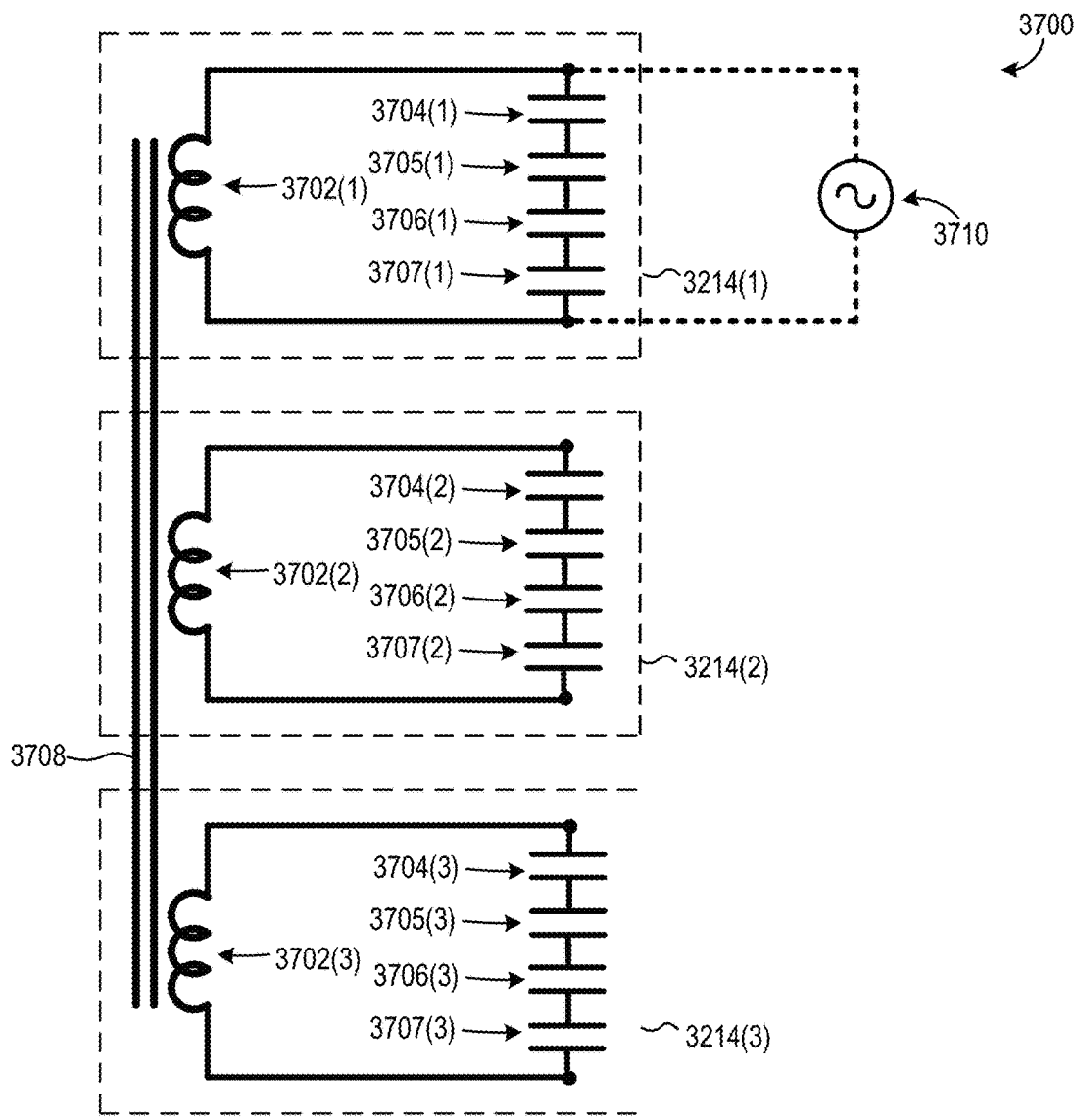
FIG. 37 shows one electrical model of the FIG. 32 resonant coil.

FIG. 37 shows one electrical model 3700 of resonant coil 3200. Model 3700 assumes that foil conductor layers 3214 are electrostatically decoupled from each other, which is a good approximation in embodiments where separation dielectric layers 3208 are significantly thicker than sublayer dielectric layers 3206. Each foil conductor layer 3214 has an inductance and capacitance, modeled by a winding turn 3702 electrically coupled in parallel with four series coupled capacitors 3704, 3705 3706, and 3707. Winding turns 3702 are magnetically coupled, as symbolically represented by a core 3708. Core 3708 is a magnetic core in embodiments where resonant coil 3200 includes a magnetic core. On the other hand, in embodiments where resonant coil 3200 does not include a magnetic core, core 3708 represents coupling without use of a magnetic core, such that core 3708 is an "air core." Electrical model 3700 also approximately represents embodiments of resonant coil 200 (FIG. 2), 2500 (FIG. 25), and 2701 (FIG. 30) where separation distances between adjacent conductor layers are significantly greater than separation distances between adjacent conductor sublayers.

Figure 38:
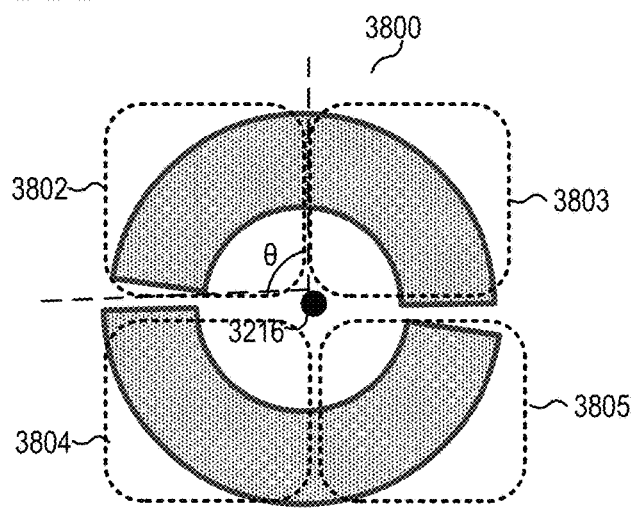
FIG. 38 shows a top plan view of the FIG. 32 resonant coil, including dashed lines approximately delineating top and bottom portions of the resonant coil.

FIG. 38 shows a top plan view of resonant coil 3200 of FIG. 32, with four portions 3802, 3803, 3804, and 3805 of multilayer conductor 3200 approximately delineated by dashed lines. Top and bottom portions are separated by notches 3228, 3230 in foil conductor sublayers 3202, 3204 (see FIGS. 33 and 34), and the left and right portions are symmetric to the center of the figure. Capacitor 3704(1), represents the capacitance between conductor sublayers 3202(1), 3204(1) in portion 3802, capacitor 3704(2) represents the capacitance between conductor sublayers 3202(2), 3204(2) in portion 3802, and capacitor 3704(3) represents capacitance between conductor sublayers 3202(3), 3204(3) in top portion 3802.

Capacitor 3705(1), represents the capacitance between conductor sublayers 3202(1), 3204(1) in portion 3803, capacitor 3705(2) represents the capacitance between conductor sublayers 3202(2), 3204(2) in portion 3803, and capacitor 3705(3) represents capacitance between conductor sublayers 3202(3), 3204(3) in portion 3803.

Capacitor 3706(1), represents the capacitance between conductor sublayers 3202(1), 3204(1) in portion 3804, capacitor 3706(2) represents the capacitance between conductor sublayers 3202(2), 3204(2) in portion 3804, and capacitor 3706(3) represents capacitance between conductor sublayers 3202(3), 3204(3) in portion 3804.

Capacitor 3707(1), represents the capacitance between conductor sublayers 3202(1), 3204(1) in portion 3805, capacitor 3707(2) represents the capacitance between conductor sublayers 3202(2), 3204(2) in portion 3805, and capacitor 3707(3) represents capacitance between conductor sublayers 3202(3), 3204(3) in portion 3805.

The capacitance values of capacitors 3704, 3705, 3406, and 3707 can be adjusted during the design of multilayer conductor 3800, such as to achieve a desired resonance. For example, capacitance can be increased by decreasing sublayer dielectric layer 3206 thickness 3224 and/or by increasing surface area of foil conductor sublayers 3202, 3204. As another example, foil conductor sublayers 3204 and 3208 can be modified to form additional discontinuities. Assuming symmetrical construction, the capacitance values of conductor sublayers 3202, 3204 are essentially identical in each foil conductor layer 3214, assuming negligible electrostatic coupling between foil conductor layers 3214.

FIG. 38 also illustrates an angle of overlap (θ) of foil conductor sublayers 3202, 3204, with respect to center axis 3216. The angle of overlap defines to what extent foil conductor sublayers 3202, 3204 overlap each other in each of top portion 3802 and bottom portion 3504. As illustrated, θ is almost 90 degrees, indicating that foil conductor sublayers 3202, 3204 almost completely overlap each other in each of top portion 3802 and bottom portion 3804.

An AC electric power source 3710 is optionally electrically coupled to multilayer conductor 3200 to drive the multilayer conductor, such that power source 3710 and multilayer conductor 3200 collectively form a system for generating a magnetic field. AC electric power source 3710 is typically electrically coupled in parallel with one foil conductor sublayer 3202, 3204, such that source is effectively electrically coupled in parallel with one winding turn 3402. For example, AC electric power source 3710 may be electrically coupled in parallel with foil conductor sublayer 3202(1), such that source 3710 is effectively electrically coupled in parallel with winding turn 3702(1), as shown. Although only one winding turn 3702 is directly connected to AC electric power source 3710, the remaining winding turns 3702 are also effectively coupled in parallel with source 3710 in the FIG. 37 example, due to magnetic coupling of winding turns 3202. Each winding turn 3702's capacitors 3704, 3706, for example, collectively serve as a resonant capacitor electrically coupled in parallel with the winding turn.

Although FIG. 37 shows AC electric power source 3710 electrically coupled in parallel with winding turn 3702(1), source 3710 could alternately be electrically coupled to a different foil conductor sublayer 3202, 3204, such that source 3710 is electrically coupled in parallel with a different winding turn 3702. Furthermore, AC electric power source 3710 could even be electrically coupled in parallel and/or in series with two of more foil conductors 3202, 3204, without departing from the scope hereof.

Figure 39:
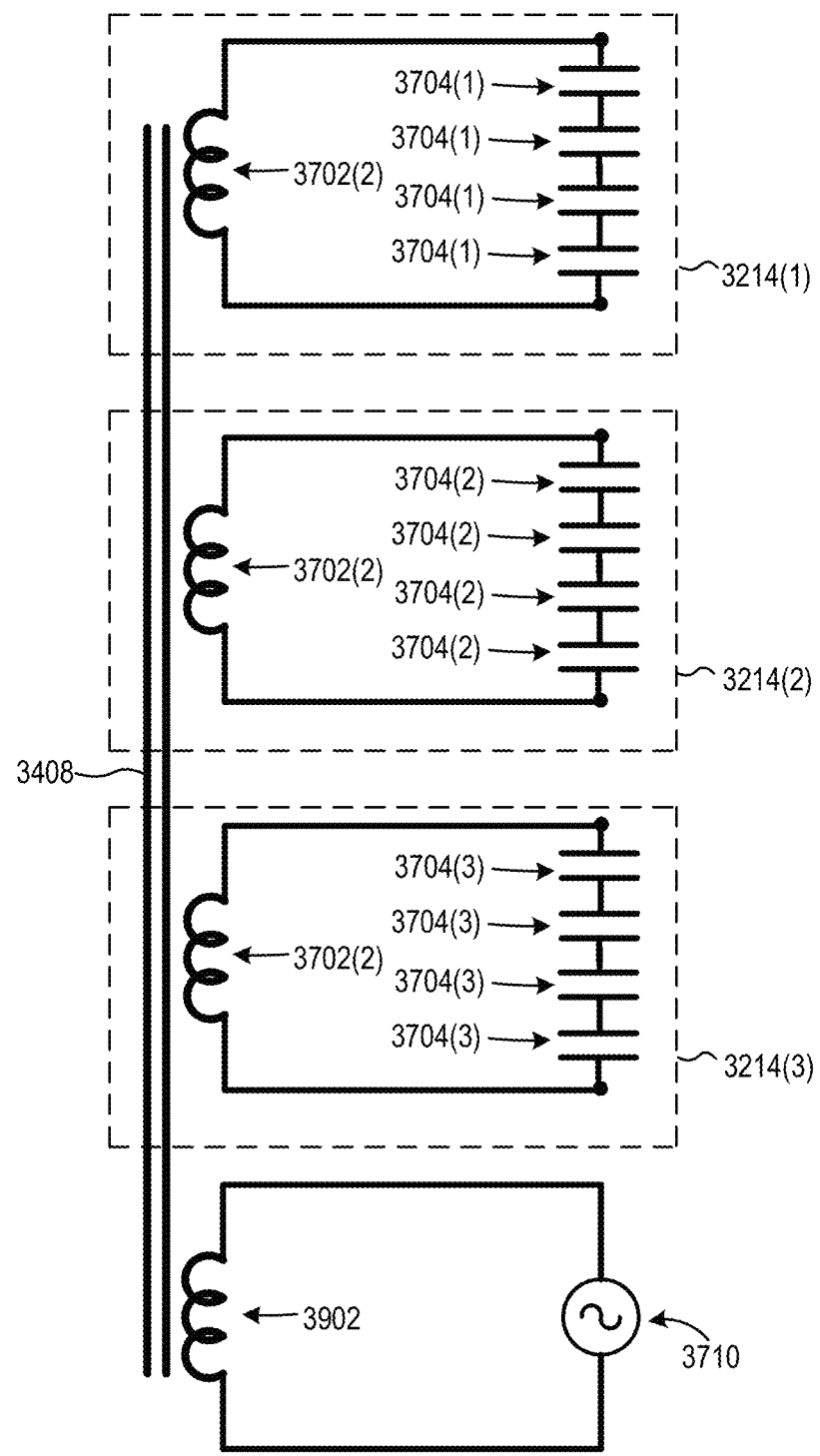
FIG. 39 shows a model including a primary coil electrically coupled to the AC electric power source, according to an embodiment.

Moreover, the system modeled in FIG. 37 could be modified such that AC electric power source 3710 is electrically coupled to a primary winding, instead of to one or more foil conductor layers 3214. For example, FIG. 39 shows a model like that of FIG. 37, but further including a primary winding 3902 galvanically isolated from foil conductor layers 3214. Primary winding 3902 is magnetically coupled to winding turns 3702, such that AC electric power source 3710 drives primary winding 3902, and primary winding 3902 drives foil conductor layers 3214 via magnetic coupling of winding turns 3902. Primary winding 3902 is formed, for example, of foil or litz wire that is galvanically isolated from foil conductor layers 3214. Primary winding 3902 could also be formed, for example, from a metallic plate disposed at the top or bottom of resonant coil 3200, where the metallic plate serves as a heat sink in addition to an electrical winding.

In some alternate embodiments, thicknesses of separation dielectric layers 3208 may be similar to or less than thicknesses of sublayer dielectric layers 3206, as discussed above. In such embodiments, there may be significant electrostatic coupling between foil conductor layers 3214, and model 3700 therefore may not be sufficiently accurate.

What is claimed is:

1. A resonant coil with integrated capacitance, comprising:
    at least one separation dielectric layer and a plurality of conductor layers stacked in an alternating manner, each of the plurality of conductor layers including:
        a first conductor sublayer forming a plurality of first discontinuities,
        a second conductor sublayer forming a plurality of second discontinuities, each second discontinuity being displaced from each first discontinuity, and
        a sublayer dielectric layer separating the first and second conductor sublayers.

2. The resonant coil of claim 1, the at least one separation dielectric layer and the plurality of conductor layers being concentrically stacked in an alternating manner around a common axis.

3. The resonant coil of claim 2, the common axis forming a loop around a center axis of the resonant coil, and the resonant coil having a toroidal shape.

4. The resonant coil of claim 3, wherein in each conductor layer:
    the first conductor sublayer forms each of the plurality of first discontinuities along the common axis, such that the first conductor sublayer does not completely encircle the center axis;
    the second conductor sublayer forms each of the plurality of second discontinuities along the common axis, such that the second conductor sublayer does not completely encircle the center axis; and each first discontinuity is angularly offset from each second discontinuity around the center axis.

5. The resonant coil of claim 3, wherein in each conductor layer:
the first conductor sublayer forms each of the plurality of first discontinuities such that the first conductor sublayer does not completely encircle the common axis;
the second conductor sublayer forms each of the plurality of second discontinuities such that the second conductor sublayer does not completely encircle the common axis; and
each first discontinuity is angularly offset from each second discontinuity around the common axis.

6. The resonant coil of claim 2, wherein in each conductor layer:
the first conductor sublayer forms each of the plurality of first discontinuities such that the first conductor sublayer does not completely encircle the common axis;
the second conductor sublayer forms each of the plurality of second discontinuities such that the second conductor sublayer does not completely encircle the common axis; and
each first discontinuity is angularly offset from each second discontinuity around the common axis.

7. The resonant coil of claim 6, the resonant coil having a cylindrical shape, as seen when the resonant coil is viewed cross-sectionally along the common axis.

8. The resonant coil of claim 6, the resonant coil having a rectangular shape, as seen when the resonant coil is viewed cross-sectionally along the common axis.

9. The resonant coil of claim 1, the at least one separation dielectric layer and the plurality of conductor layers being stacked in an alternating manner in a thickness direction.

10. The resonant coil of claim 9, wherein in each conductor layer, each first discontinuity is angularly offset from each second discontinuity around a center axis extending in the thickness direction.

11. A resonant coil with integrated capacitance, comprising:
at least one separation dielectric layer and a plurality of conductor layers stacked in an alternating manner, each of the plurality of conductor layers including:
a first conductor sublayer forming a plurality of first discontinuities,
a second conductor sublayer forming a plurality of second discontinuities, each second discontinuity being aligned with each first discontinuity, and
a sublayer dielectric layer separating the first and second conductor sublayers;
wherein adjacent conductor layers of the plurality of conductor layers have different orientations.

12. The resonant coil of claim 11, the at least one separation dielectric layer being formed of a first material, the sublayer dielectric layer of each of the plurality of conductor layers being formed of a second material, the first material having a lower dielectric loss than the second material.

13. The resonant coil of claim 11, the at least one separation dielectric layer and the plurality of conductor layers being concentrically stacked in an alternating manner around a common axis.

14. The resonant coil of claim 13, the common axis forming a loop around a center axis of the resonant coil, and the resonant coil having a toroidal shape.

15. The resonant coil of claim 14, wherein in each conductor layer:
the first conductor sublayer forms each of the plurality of first discontinuities along the common axis, such that the first conductor sublayer does not completely encircle the center axis;
the second conductor sublayer forms each of the plurality of second discontinuities along the common axis, such that the second conductor sublayer does not completely encircle the center axis; and
each first discontinuity is angularly aligned with a respective second discontinuity, around the center axis.

16. The resonant coil of claim 14, wherein in each conductor layer:
the first conductor sublayer forms each of the plurality of first discontinuities such that the first conductor sublayer does not completely encircle the common axis;
the second conductor sublayer forms each of the plurality of second discontinuities such that the second conductor sublayer does not completely encircle the common axis; and
each first discontinuity is angularly aligned with a respective second discontinuity around the common axis.

17. The resonant coil of claim 13, wherein in each conductor layer:
the first conductor sublayer forms each of the plurality of first discontinuities such that the first conductor sublayer does not completely encircle the common axis;
the second conductor sublayer forms each of the plurality of second discontinuities such that the second conductor sublayer does not completely encircle the common axis; and
each first discontinuity is angularly aligned with a respective second discontinuity around the common axis.

18. The resonant coil of claim 17, the resonant coil having a cylindrical shape, as seen when the resonant coil is viewed cross-sectionally along the common axis.

19. The resonant coil of claim 17, the resonant coil having a rectangular shape, as seen when the resonant coil is viewed cross-sectionally along the common axis.

20. The resonant coil of claim 11, the at least one separation dielectric layer and the plurality of conductor layers being stacked in an alternating manner in a thickness direction.

21. The resonant coil of claim 20, wherein in each conductor layer, each first discontinuity is angularly aligned with a respective second discontinuity around a center axis extending in the thickness direction.

22. The resonant coil of claim 1, wherein at least one conductor layer of the plurality of conductor layers varies in thickness.

23. The resonant coil of claim 1, wherein the at least one separation dielectric layers varies in thickness.

* * * * *